United States Patent
Arsenault et al.

(10) Patent No.: US 7,085,529 B1
(45) Date of Patent: Aug. 1, 2006

(54) METHOD AND APPARATUS FOR DETERMINING A DIRECT-TO-HOME SATELLITE RECEIVER MULTI-SWITCH TYPE

(75) Inventors: Robert G. Arsenault, Redondo Beach, CA (US); Robert J. Rothaus, Placentia, CA (US)

(73) Assignee: The DirecTV Group, Inc., El Segundo, CA (US)

( * ) Notice: Subject to any disclaimer, the term of this patent is extended or adjusted under 35 U.S.C. 154(b) by 926 days.

(21) Appl. No.: 10/003,545

(22) Filed: Oct. 24, 2001

(51) Int. Cl.
H04H 1/00 (2006.01)

(52) U.S. Cl. .................... 455/3.02; 455/3.01; 455/3.04; 455/12.1; 725/71; 725/72; 725/68

(58) Field of Classification Search ................ 455/3.01, 455/3.02, 3.04, 12.1, 180.1, 180.2, 188.1, 455/188.2; 725/71, 72, 68
See application file for complete search history.

(56) References Cited

U.S. PATENT DOCUMENTS

| 4,694,490 A | 9/1987 | Harvey et al. |
| 5,251,332 A | 10/1993 | Hansen |
| 5,260,778 A | 11/1993 | Kauffman et al. |
| 5,319,707 A | 6/1994 | Wasilewski et al. |
| 5,345,594 A | 9/1994 | Tsuda |
| 5,446,919 A | 8/1995 | Wilkins |
| 5,497,206 A | 3/1996 | Ji |
| 5,583,562 A | 12/1996 | Birch et al. |
| 5,603,077 A | 2/1997 | Muckle et al. |
| 5,625,693 A | 4/1997 | Rohatgi et al. |
| 5,631,903 A | 5/1997 | Dianda et al. |
| 5,649,318 A | 7/1997 | Lusignan |
| 5,666,293 A | 9/1997 | Metz et al. |

(Continued)

FOREIGN PATENT DOCUMENTS

EP    1030463 A2    8/2000

*Primary Examiner*—Nay Maung
*Assistant Examiner*—Sujatha Sharma
(74) *Attorney, Agent, or Firm*—Georgann S. Grunebach

(57) ABSTRACT

The system and method described herein is used to determine the type of multi-switch connected to a direct-to-home satellite integrated receiver/decoder. The system looks for a predetermined marker pattern on the first port of a multi-switch using a first type of control signal (e.g., DiSEqC control signals) not knowing if this type of control signal will work, because the type of multi-switch is undetermined. If the marker is found on the first port, the system changes the control signal to address the third port of the multi-switch. If the marker is also acquired from the third port, and the second marker is the same as the first marker, then the multi-switch is ignoring the control signals and the process is repeated using a different pair of multi-switch ports (e.g., ports two and four) and/or a different type of control signal (e.g., tone control signals). However, if a different marker (or no marker) is found on the third port, then the multi-switch is responding to the control signals (e.g., DiSEqC control signals). Therefore, the type of multi-switch is determined (e.g., a DiSEqC type of multi-switch).

21 Claims, 19 Drawing Sheets

U.S. PATENT DOCUMENTS

| | | | |
|---|---|---|---|
| 5,734,589 A | 3/1998 | Kostreski et al. | |
| 5,742,680 A | 4/1998 | Wilson | |
| 5,760,820 A | 6/1998 | Eda et al. | |
| 5,767,913 A | 6/1998 | Kassatly | |
| 5,768,539 A | 6/1998 | Metz et al. | |
| 5,864,747 A | 1/1999 | Clark et al. | |
| 5,886,995 A | 3/1999 | Arsenault et al. | |
| 5,892,508 A | 4/1999 | Howe et al. | |
| 5,892,536 A | 4/1999 | Logan et al. | |
| 5,894,320 A | 4/1999 | Vancelette | |
| 5,923,362 A | 7/1999 | Klosterman | |
| 6,940,737 B1 | 8/1999 | Eastman | |
| 5,951,639 A | 9/1999 | MacInnis | |
| 5,978,037 A | 11/1999 | Hilpert et al. | |
| 6,009,116 A | 12/1999 | Bednarek et al. | |
| 6,009,307 A | 12/1999 | Granata et al. | |
| 6,011,597 A | 1/2000 | Kubo | |
| 6,052,554 A | 4/2000 | Hendricks et al. | |
| 6,067,107 A | 5/2000 | Travaille et al. | |
| 6,067,440 A | 5/2000 | Diefes | |
| 6,101,171 A | 8/2000 | Yoshida et al. | |
| 6,160,988 A | 12/2000 | Shroyer | |
| 6,169,877 B1 | 1/2001 | Gulla' | |
| 6,172,972 B1 | 1/2001 | Birdwell et al. | |
| 6,208,636 B1 | 3/2001 | Tawil et al. | |
| 6,212,682 B1 | 4/2001 | Kuno | |
| 6,263,506 B1 | 7/2001 | Ezaki et al. | |
| 6,310,661 B1 | 10/2001 | Arsenault | |
| 6,331,979 B1 | 12/2001 | Dillon et al. | |
| 6,363,525 B1 | 3/2002 | Dougherty et al. | |
| 6,408,437 B1 | 6/2002 | Hendricks et al. | |
| 6,430,165 B1 * | 8/2002 | Arsenault | 370/316 |
| 6,441,797 B1 * | 8/2002 | Shah | 343/840 |
| 6,675,384 B1 | 1/2004 | Block et al. | |
| 6,741,574 B1 * | 5/2004 | Arsenault | 370/316 |
| 2002/0154055 A1 * | 10/2002 | Davis et al. | 342/352 |
| 2004/0060065 A1 * | 3/2004 | James et al. | 725/71 |

* cited by examiner

FIG. 7

| Simplified Control Signal | Simplified DISEqC Control Signal | Multi-switch (if present) Input Port Number Connected to Output Port | Non-stacked LNB Option 1 (Figure 2) | Non-stacked LNB Option 1 (Figure 3) | Non-stacked LNB Option 1 (Figure 3) | Non-stacked LNB Option 1 (Figure 4) | Non-stacked LNB Option 1 (Figure 4) | Stacked LNB Option 2 (Figure 5) |
|---|---|---|---|---|---|---|---|---|
| +13 V | +13V & addr= 0001 + cmd= 0x02 | 1 | Network 0 RHCP | Network 0 RHCP | Network 0 RHCP | Network 0 RHCP | Network 0 RHCP | Network 0 RHCP & LHCP |
| +18 V | +18V & addr= 0001 + cmd= 0x02 | 2 | Network 0 LHCP | Network 0 LHCP | Network 0 LHCP | Network 0 LHCP | Network 0 LHCP | Network 3 RHCP & Network 2&3 LHCP |
| +13 V & 22KHz | +13V & addr= 0001 + cmd= 0x03 | 3 | Not used | Network 1 VP | Network 3 RHCP | Network 3 RHCP | Network 3 RHCP | For future use |
| +18 V & 22KHz | +18V & addr= 0001 + cmd= 0x03 | 4 | Not used | Network 1 HP | Network 3 LHCP | Network 2&3 LHCP | Network 2&3 LHCP | For future use |
| Not used | +13V & addr= 0001 + cmd= 0x04 | 5 | Not used | Not used | Not used | Not used | For future use | For future use |
| Not used | +18V & addr= 0001 + cmd= 0x04 | 6 | Not used | Not used | Not used | Not used | For future use | For future use |
| Not used | +13V & addr= 0001 + cmd= 0x05 | 7 | Not used | Not used | Not used | Not used | For future use | For future use |
| Not used | +18V & addr= 0001 + cmd= 0x05 | 8 | Not used | Not used | Not used | Not used | For future use | For future use |

Rows 1–4: 4 input multi-switch
Rows 5–8: 8 input multi-switch

US 7,085,529 B1

METHOD AND APPARATUS FOR DETERMINING A DIRECT-TO-HOME SATELLITE RECEIVER MULTI-SWITCH TYPE

TECHNICAL FIELD OF THE INVENTION

The present invention relates in general to an automatic determination of satellite equipment type and in particular to a method and apparatus for determining a direct-to-home satellite receiver multi-switch type.

BACKGROUND

Many direct-to-home satellite television systems, such as the DirecTV system, may be configured to receive signals from more than one satellite (e.g., satellite location or satellite type) and/or other source of programming. When only one such signal is used, an integrated receiver/decoder (IRD) in the user's home may be connected directly to a low noise block (LNB) of a receiving dish to receive signals from that source, e.g., satellite, location. When more than one such signal is used, a multi-switch device may be used to enable the IRD to access one of many sources (e.g., LNB inputs) independently, such that only the selected signal or source is supplied to the input of the IRD.

Such multi-switches and their functions are well known. In general, a multi-switch provides a matrix switch or signal router, which connects at least one output to a selected one of a plurality of inputs. The inputs may be connected to different signal sources (e.g., different LNB outputs) and at least one output connected to the input of a receiver (e.g., IRD). The switch may then be controlled by means of a control signal to selectively route the desired signal to the receiver. The control signal is typically generated by the receiver and supplied to the multi-switch, typically using the source coaxial connection between the multi-switch and receiver that carries the higher frequency (e.g., L-band) received signals.

Due to the availability of multi-switches from more than one manufacturer and the changes to multi-switches as technology advances, more than one type of multi-switch is available. Different types of multi-switches are controlled by different control signals. Accordingly, the receiver software must know which type of multi-switch is connected to the receiver in order to provide the proper control signals when addressing the multi-switch. One way to provide such information to the receiver is to have the user enter the type of multi-switch via a user interface control on the receiver.

However, requiring the user to provide the multi-switch type to the receiver has certain drawbacks. First, the multi-switch may be physically inaccessible to the customer. For example, in a multi-dwelling environment, such as an apartment building, the multi-switch may be part of the building infrastructure. In such an instance, the customer may not be able to determine the type of multi-switch employed. In addition, customers are burdened by extra setup procedures. Often theses setup procedures require the user to read a portion of a users manual, and if the procedure is not followed correctly, the system may not function properly.

SUMMARY OF THE INVENTION

In one aspect, the invention is directed to a method for automatically determining the type of multi-switch connected to a receiver, e.g., a direct-to-home satellite receiver in certain embodiments. The method comprises the step of generating a first control signal at a multi-switch connection port. The first control signal is preferably designed to address a first port of a first type of multi-switch. The method further comprises the step of determining if a first predetermined marker pattern is received within a first predetermined time limit after generating the first control signal. The first predetermined marker pattern preferably includes a first identification code. The method further comprises the step of generating a second control signal at the multi-switch connection port. The second control signal is preferably designed to address a second port of the first type of multi-switch. The method further comprises the step of determining if a second predetermined marker pattern is received within a second predetermined time limit after generating the second control signal. The second predetermined marker pattern preferably includes a second identification code. The method further comprises the steps of determining if the first identification code is equal to the second identification code, and determining that the multi-switch type is the first type of multi-switch if the first identification code is not equal to the second identification code.

In some embodiments, the step of generating a first control signal at a multi-switch connection port, comprises the step of generating a DiSEqC control signal at the multi-switch connection port. In some embodiments, the step of generating a first control signal at a multi-switch connection port, comprises the step of generating a tone control signal at the multi-switch connection port. In some embodiments, the step of generating a first control signal at a multi-switch connection port, comprises the step of generating 13 volts and/or 18 volts at the multi-switch connection port. In some embodiments, the step of determining if a first predetermined marker pattern is received, comprises the step of determining if the first predetermined marker pattern is received on a service channel with an identification number of 0x810. In some embodiments, the method further comprises the step of determining that the multi-switch type is the first type of multi-switch if the step of determining if a first predetermined marker pattern is received determines that the first predetermined marker pattern is received and the step of determining if a second predetermined marker pattern is received determines that the second predetermined marker pattern is not received.

In some embodiments, the method further comprises the step of generating a third control signal at the multi-switch connection port. The third control signal is preferably designed to address a first port of a second type of multi-switch. In some embodiments, the method further comprises the step of determining if a third predetermined marker pattern is received within a third predetermined time limit after generating the third control signal. The third predetermined marker pattern preferably includes a third identification code. In some embodiments, the method further comprises the step of generating a fourth control signal at the multi-switch connection port. The fourth control signal is preferably designed to address a second port of the second type of multi-switch. In some embodiments, the method further comprises the step of determining if a fourth predetermined marker pattern is received within a fourth predetermined time limit after generating the fourth control signal. The fourth predetermined marker pattern preferably includes a fourth identification code. In some embodiments, the method further comprises the steps of determining if the third identification code is equal to the fourth identification code, and determining that the multi-switch type is the second type of multi-switch if the third identification code is not equal to the fourth identification code.

In another aspect the invention is directed to an integrated receiver/decoder for use in a direct-to-home satellite system. The integrated receiver/decoder comprises a receiver for receiving direct-to-home satellite television signals. The integrated receiver/decoder further comprises a multi-switch connection port coupled to the receiver for selecting direct-to-home satellite television signals. The integrated receiver/decoder further comprises a controller operatively coupled to the receiver and the multi-switch connection port. The controller includes a microprocessor and a memory device. The memory device stores a software program. The software program is designed to generate a first control signal at the multi-switch connection port. The first control signal being designed to address a first port of a first type of multi-switch. The software program is also designed to determine if a first predetermined marker pattern is received within a first predetermined time limit after generating the first control signal. The first predetermined marker pattern preferably includes a first identification code. The software program is also designed to generate a second control signal at the multi-switch connection port. The second control signal is preferably designed to address a second port of the first type of multi-switch. The software program is also designed to determine if a second predetermined marker pattern is received within a second predetermined time limit after generating the second control signal. The second predetermined marker pattern preferably includes a second identification code. The software program is also designed to determine if the first identification code is equal to the second identification code, and to determine that the multi-switch type is the first type of multi-switch if the first identification code is not equal to the second identification code.

BRIEF DESCRIPTION OF THE DRAWINGS

These and other features and advantages of the present invention will be apparent to those of ordinary skill in the art in view of the detailed description of the preferred embodiment which is made with reference to the drawings, a brief description of which is provided below.

FIG. 7 is a table showing a preferred set of control signals used to select a port on a multi-switch device.

DETAILED DESCRIPTION OF THE PREFERRED EMBODIMENTS

Figure 1:
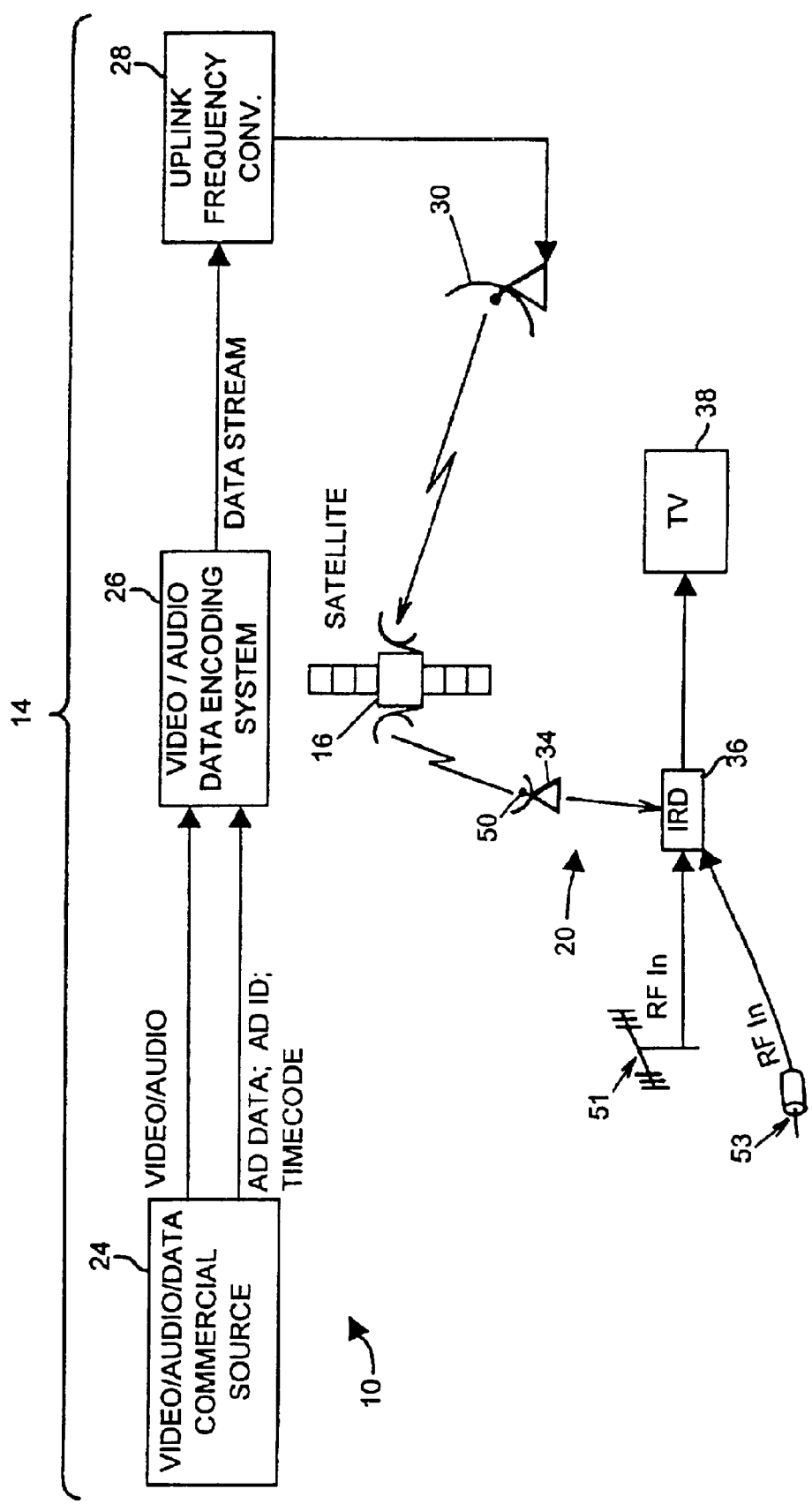
FIG. 1 is a high level block diagram of a direct-to-home satellite broadcast system.
Figure 2:
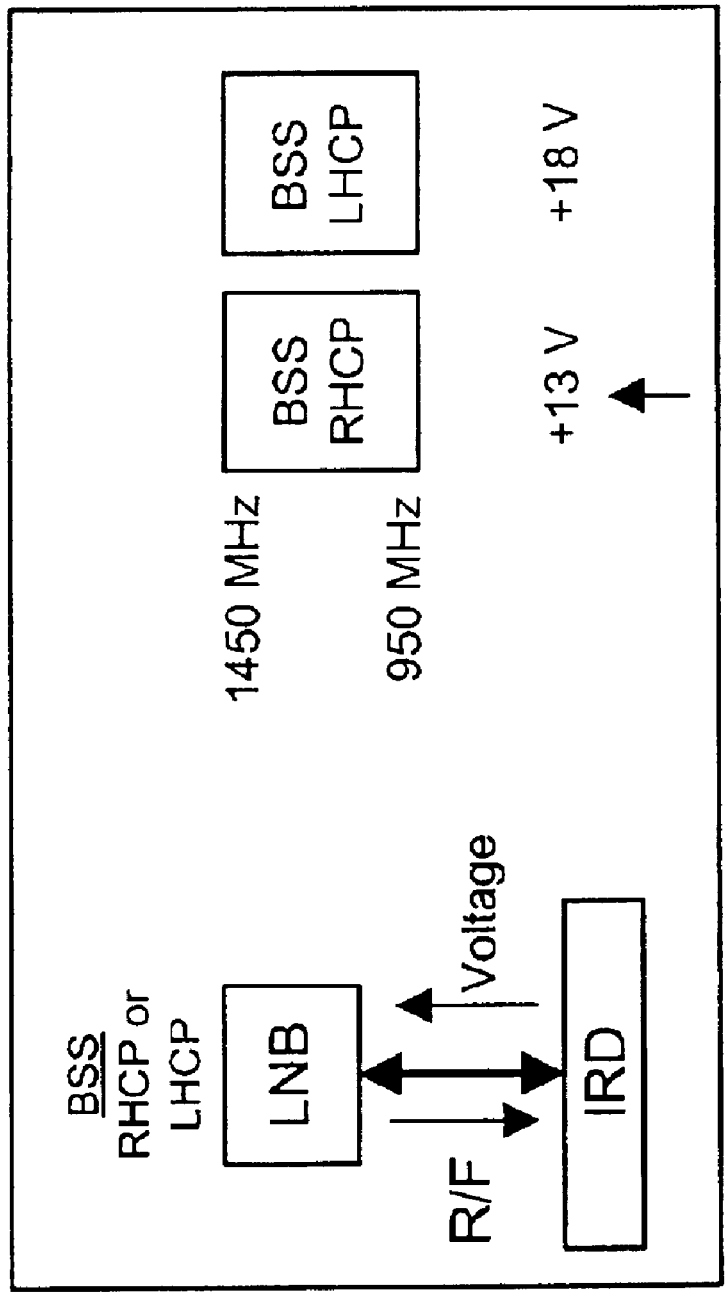
FIGS. 2–5 are block diagrams illustrating exemplary configurations of satellite resources connected to the receiver station of FIG. 1 using a multi-switch device.
Figure 3:
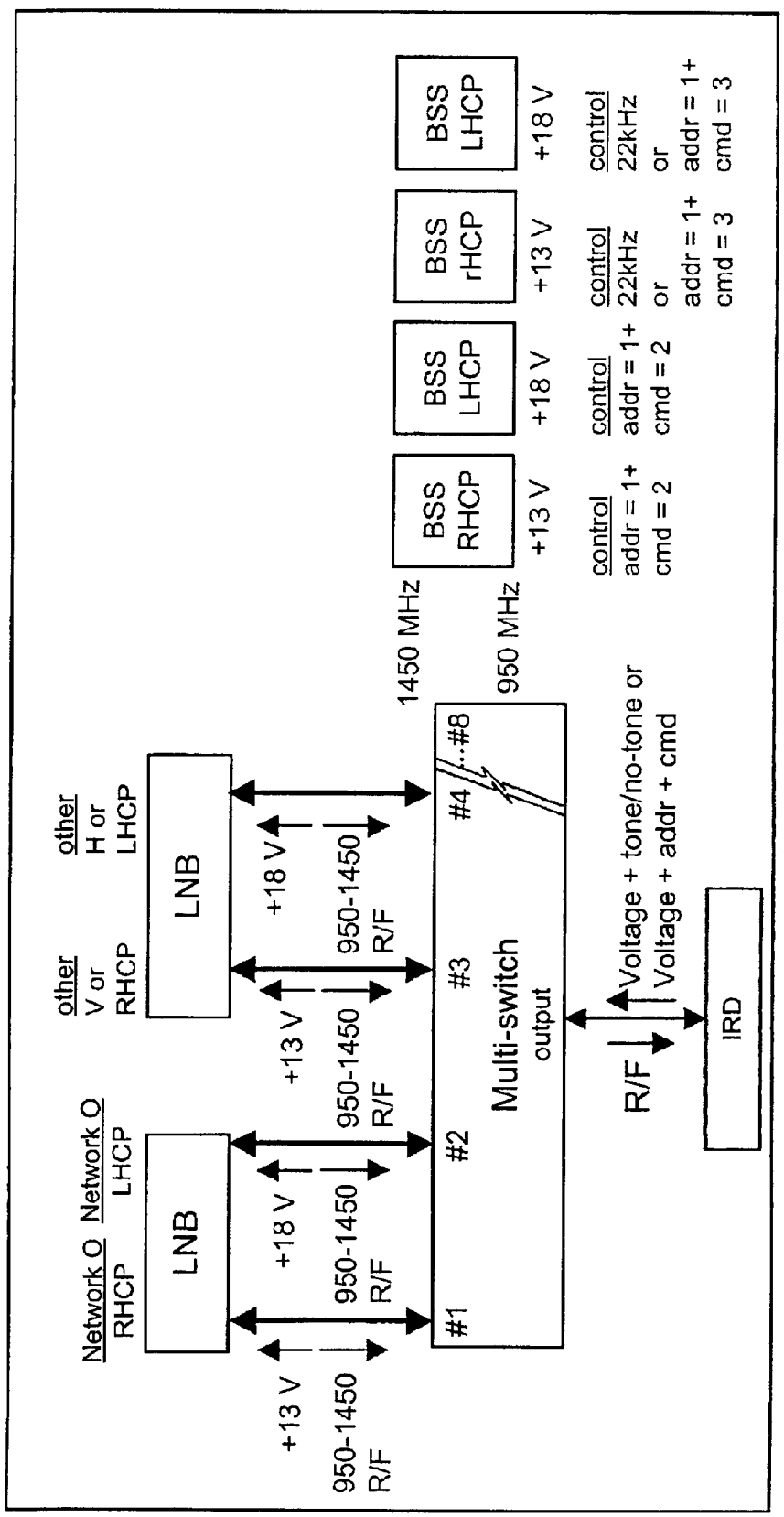
Figure 4:
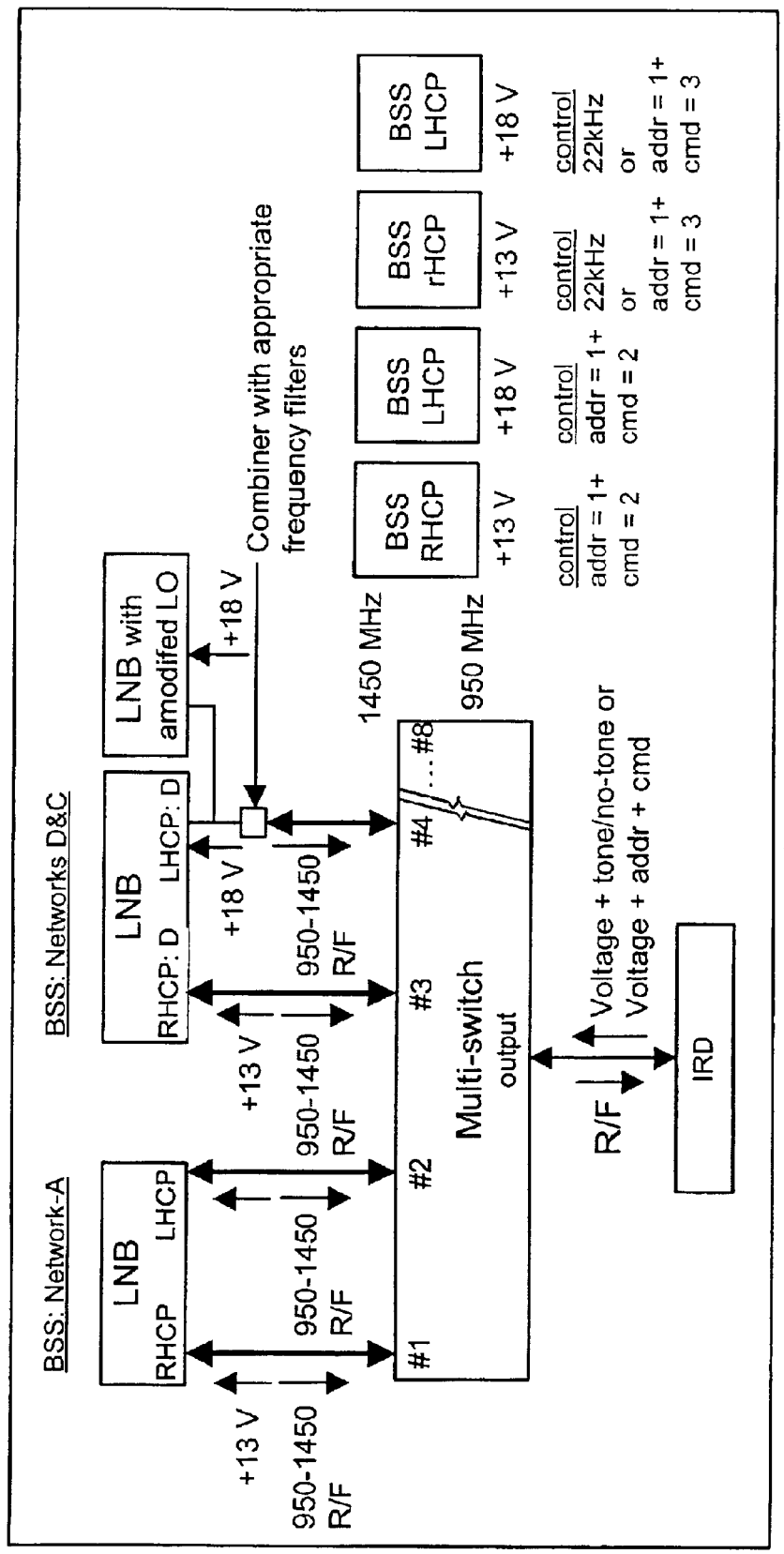
Figure 5:
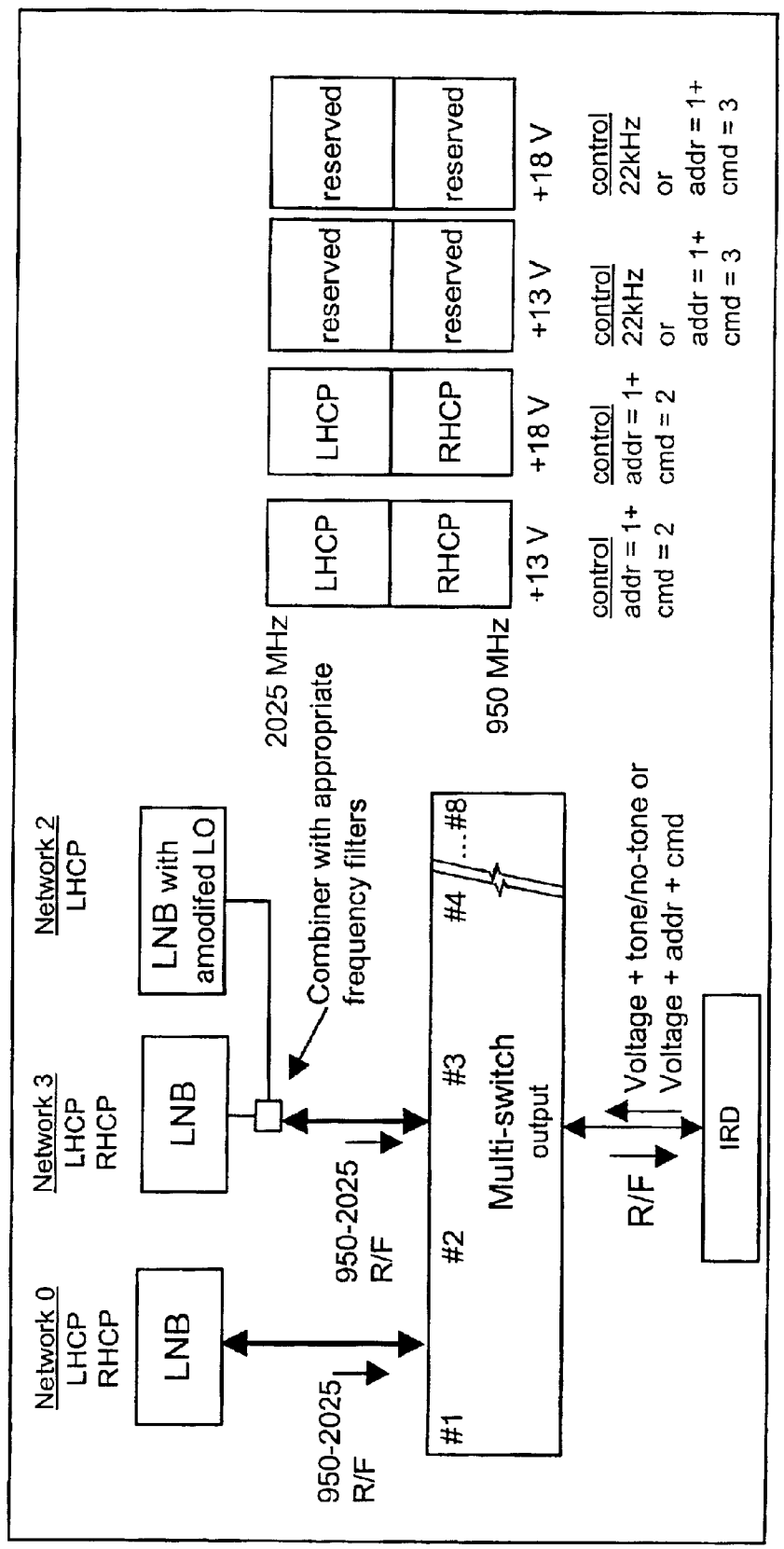

In general, the system and method described herein is used to determine the type of multi-switch connected to a receiver, which in certain embodiments may comprise a direct-to-home satellite integrated receiver/decoder. The system looks for a predetermined marker pattern on the first port of a multi-switch using a first type of control signal not knowing if this type of control signal will work, because the type of multi-switch is undetermined. For example, a subset of the well known Digital Satellite Equipment Control signals (DiSEqC signals) may be used. If the marker is found on the first port, the system changes the control signal to address the third port of the multi-switch. If the marker is also acquired from the third port, and the second marker is the same as the first marker, then the multi-switch is ignoring the control signals and the process is repeated using a different pair of multi-switch ports (e.g., ports two and four) and/or a different type of control signal (e.g., tone control signals). However, if a different marker (or no marker) is found on the third port, then the multi-switch is responding to the control signals (e.g., DiSEqC control signals). Therefore, the type of multi-switch is determined (e.g., a DiSEqC type of multi-switch).

Typically, television signal distribution systems rely on either a cable network or a free-space propagation system for delivering television signals to individual users or subscribers. Cable-based television systems transmit individual television signals or "channels" over a wire. Free-space propagation systems transmit a plurality of channels over-the-air, i.e., in a wireless manner. Most large-scale cable and wireless television signal distribution systems broadcast a broadband television signal having a plurality of individual television signals or channels modulated onto one or more carrier frequencies within a discernable frequency band.

Some wireless television signal distribution systems use one or more geosynchronous satellites to broadcast the broadband television signal to receiver units within a large geographic area. Other wireless systems are land-based and use one or more transmitters located within smaller geographic areas to broadcast to individual receiver units within those geographic areas.

Typically, such wireless systems include a receiver for receiving and processing transmitted waveforms. One type of receiver is part of a wireless digital television system utilized by the DIRECTV® broadcast service. The DIRECTV system allows residential consumers to receive over 175 television channels from geosynchronous satellites. A first constellation of satellites are co-located at 101° W.L. and may be accessed by an antenna having a single low noise block converter (LNB). The receiver includes a small (e.g., 18-inch) satellite antenna (e.g., reflective dish and LNB) connected by a cable to an integrated receiver/decoder unit (IRD). The satellite antenna is aimed toward the satellites, and the IRD is connected to the users television in a fashion similar to a conventional cable-TV decoder.

Additional satellites in other geosynchronous locations (e.g., 110° W.L. and 119° W.L.) are also used to provide additional programming signals. The signals from such additional satellites may be received by separate antennas comprising reflectors and LNBs, or by combined antennas comprising multiple LNBs and a common reflector.

On the transmission side, video, audio, and related information data signals are digitally encoded into a packetized data stream using a number of algorithms, including convolutional error correction. The encoded data stream is then compressed to reduce bandwidth requirements, modulated to Ku-band frequency, transmitted to the satellites, and relayed from the satellites to the satellite antenna. The LNB (low noise block) of a satellite antenna shifts the Ku-band signal down to an L-band signal which may then be transmitted through a cable (e.g., coaxial cable) to the IRD.

In the IRD, front-end circuitry receives the L-band signal and coverts it to the original digital data stream of video, audio, and related information signals. The digital data stream is fed to video/audio decoder circuits which perform the main video/audio processing functions such as demultiplexing and decompression. A micro-controller controls the overall operation of the IRD, including the selection of parameters, the set-up and control of components, channel selection, viewer access to different programming packages, blocking certain channels, and many other functions. The compression and decompression of packetized video and audio signals may be accomplished according to the Motion Picture Expert Group (MPEG) standards for performing digital video/audio compression. Thus, the IRD unit typically includes an MPEG-1 and/or MPEG-2 video/audio decoder in order to decode the received MPEG encoded video/audio.

FIG. 1 is a block diagram of a transmission and reception system 10. The illustrated system 10 includes a transmission station 14, a relay 16, and a plurality of receiver stations, one of which is shown at reference numeral 20. A wireless airlink provides the communications medium between the transmission station 14, the relay 16, and the receiver station 20. The transmission station 14 includes a programming/data source 24, a video/audio/data encoding system 26, an uplink frequency converter 28, and an uplink satellite antenna 30. The relay 16 is preferably at least one geosynchronous satellite. The receiver station 20 includes a satellite reception antenna 34 which may comprise a low-noise-block (LNB) 50, a receiver unit (or IRD) 36 connected to the LNB 50, and a television monitor 38 (or other output device) connected to the receiver unit 36.

In operation, the transmission station 14 can receive video and audio programming from a number of sources, including satellites, terrestrial fiber optics, cable, and/or tape. Preferably, the received programming signals, along with data signals such as electronic scheduling data and conditional access data, are sent to the video/audio/data encoding system 26 where they are digitally encoded and multiplexed into a packetized data stream using a number of conventional algorithms, including convolutional error correction and compression. In a conventional manner, the encoded data stream is modulated and sent through the uplink frequency converter 28 which converts the modulated encoded data stream to a frequency band suitable for reception by the satellite 16. Preferably, the satellite frequency is Ku-band. The modulated, encoded data stream is then routed from the uplink frequency converter 28 to an uplink satellite antenna 30 where it is broadcast toward the satellite 16 over the airlink. The satellite 16 receives the modulated, encoded Ku-band data stream and re-broadcasts it downward toward an area on earth that includes the various receiver stations 20. The LNB 50 of the satellite antenna 34 of the receiver station 20 shifts the Ku-band signal down to an L-band signal which is transmitted to the receiver unit 36.

Block diagrams illustrating exemplary configurations of LNBs 50 connected to the receiver unit 36 using a multi-switch device 200 are illustrated in FIGS. 2–5. Although these examples use a multi-switch 200 to connect the receiver unit 36 to one or more LNBs 50, persons of ordinary skill in the art will readily appreciate that the receiver unit 36 may be connected to LNBs 50 or other satellite resources with or without the use of a multi-switch 200. Also, multiple IRDs can be connected to a multi-switch that has multiple outlets. Further, the LNBs 50 may be stacked or non-stacked and may use a polarity switching scheme or a single stacked frequency distribution of both polarities simultaneously.

For example, the receiver unit 36 may select one of eight input ports associated with one of four LNBs 50 via the multi-switch 200 by outputting a control signal to the multi-switch 200. The multi-switch 200 in turn provides a control signal to the LNB 50. The right hand or the left hand outputs may be selected at each LNB 50. In one embodiment, the control signals consist of (i)+13V, (ii)+18V, (iii)+13V and 22 kHz, and (iv)+18V and 22 kHz. Of course, a person of ordinary skill in the art will readily appreciate that any number and any type of control signals may be used. For example, addressing commands (e.g., DiSEqC commands) may be sent to select a particular LNB 50.

Figure 6:
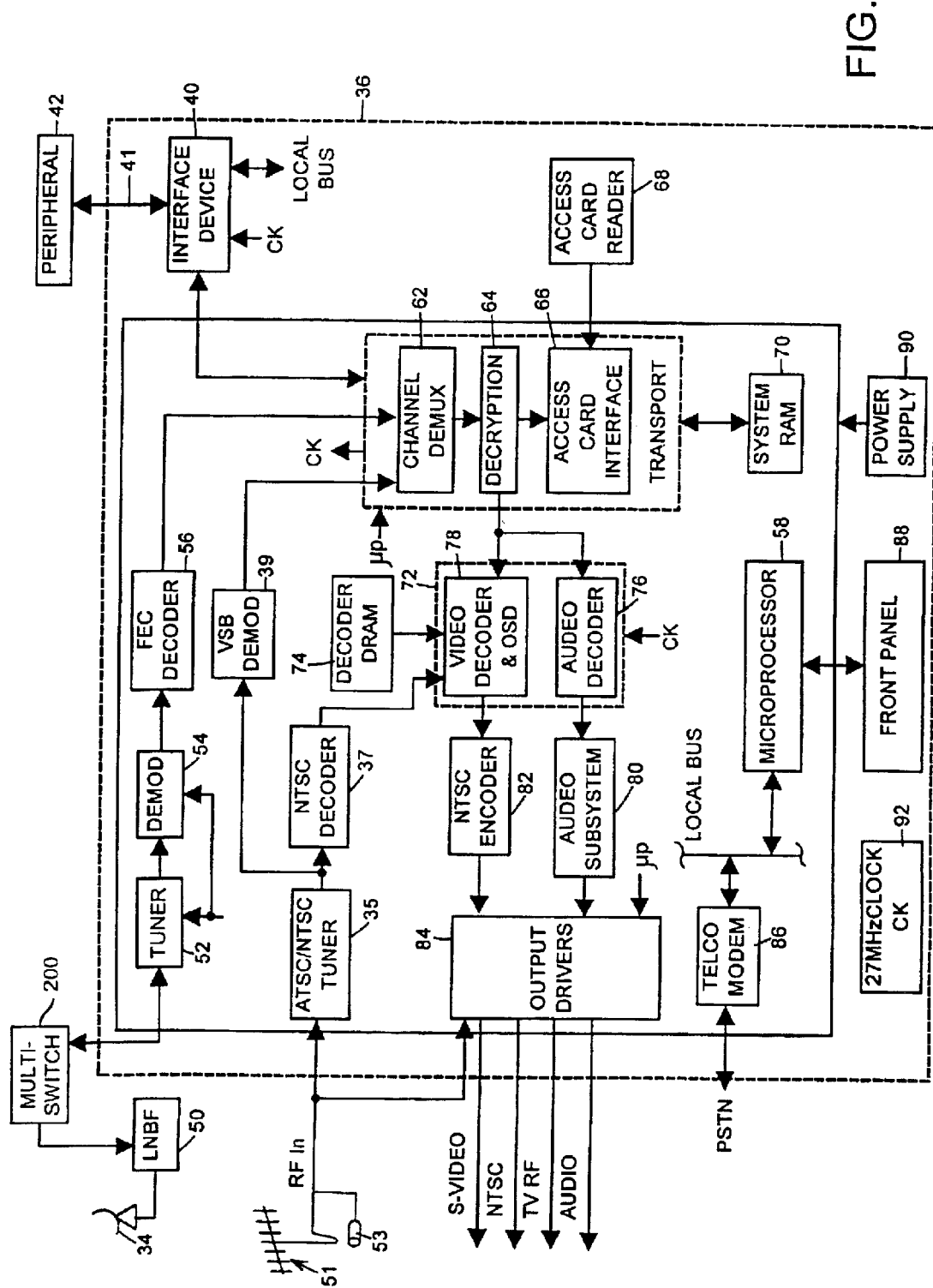
FIG. 6 is a more detailed block diagram of the receiver station of FIG. 1.
Figure 8:
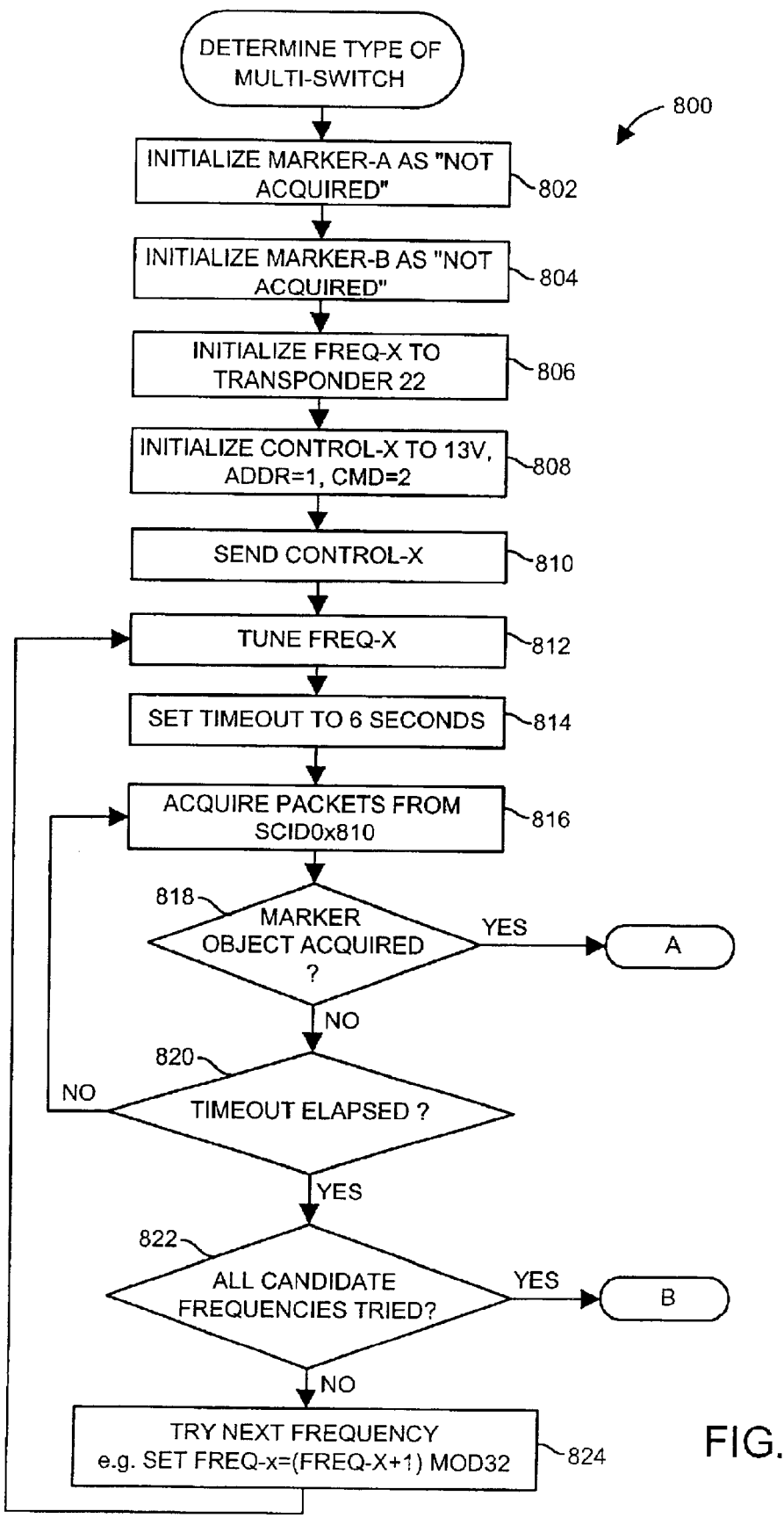
FIGS. 8–19 are a flowchart of a program that can be implemented by the receiver station of FIG. 6 to determine the type of multi-switch connected to the receiver station.
Figure 9:
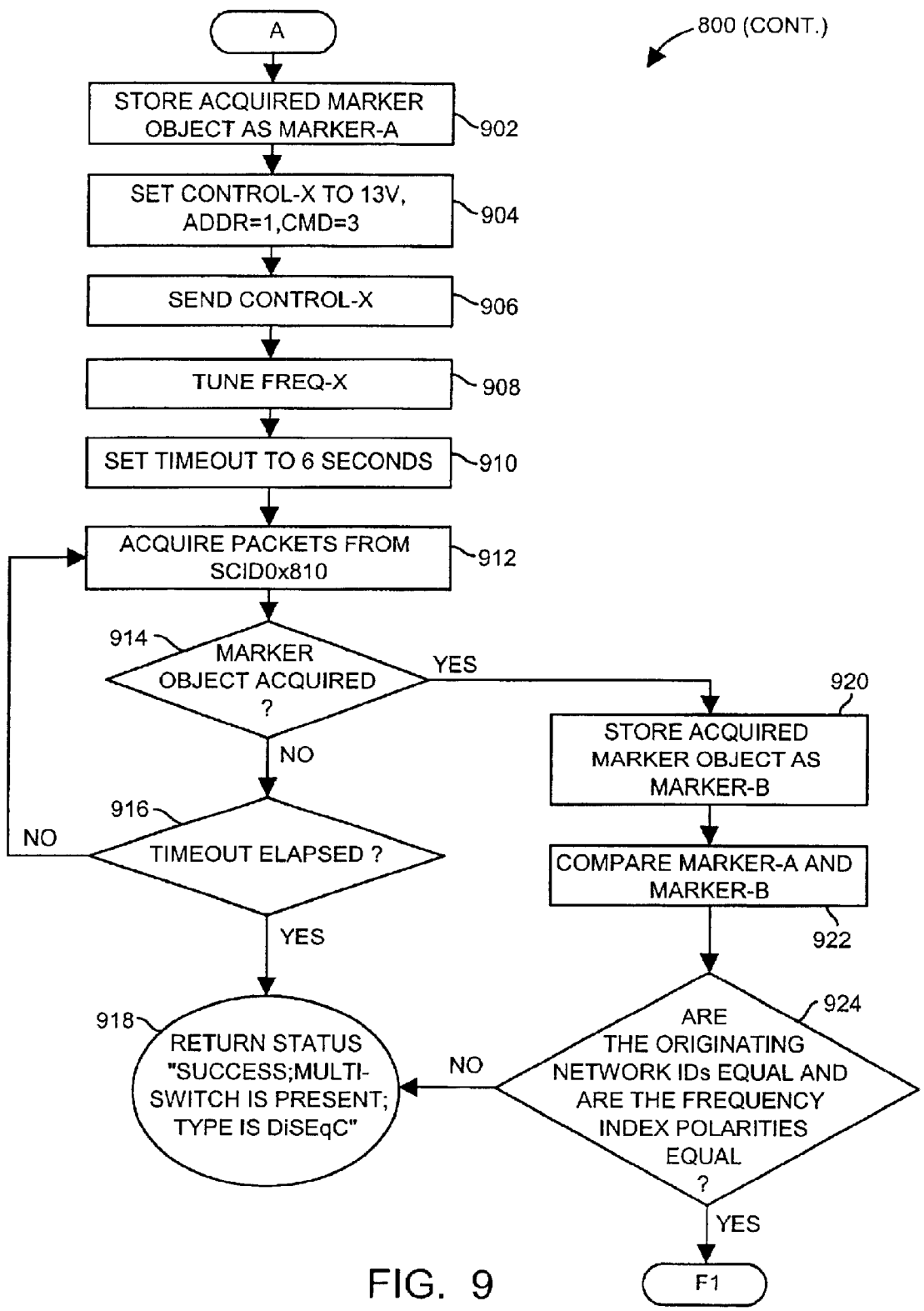
Figure 10:
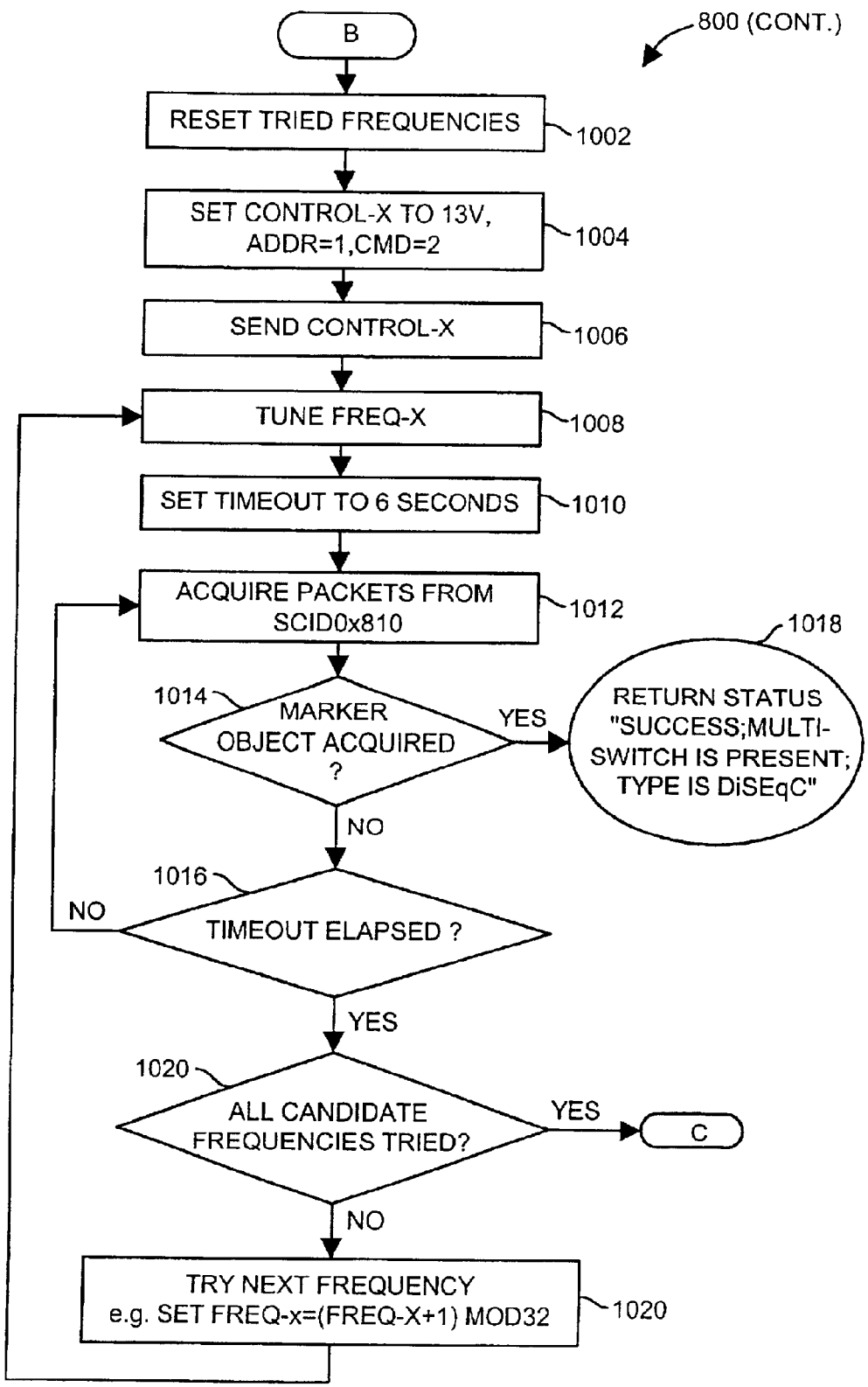
Figure 11:
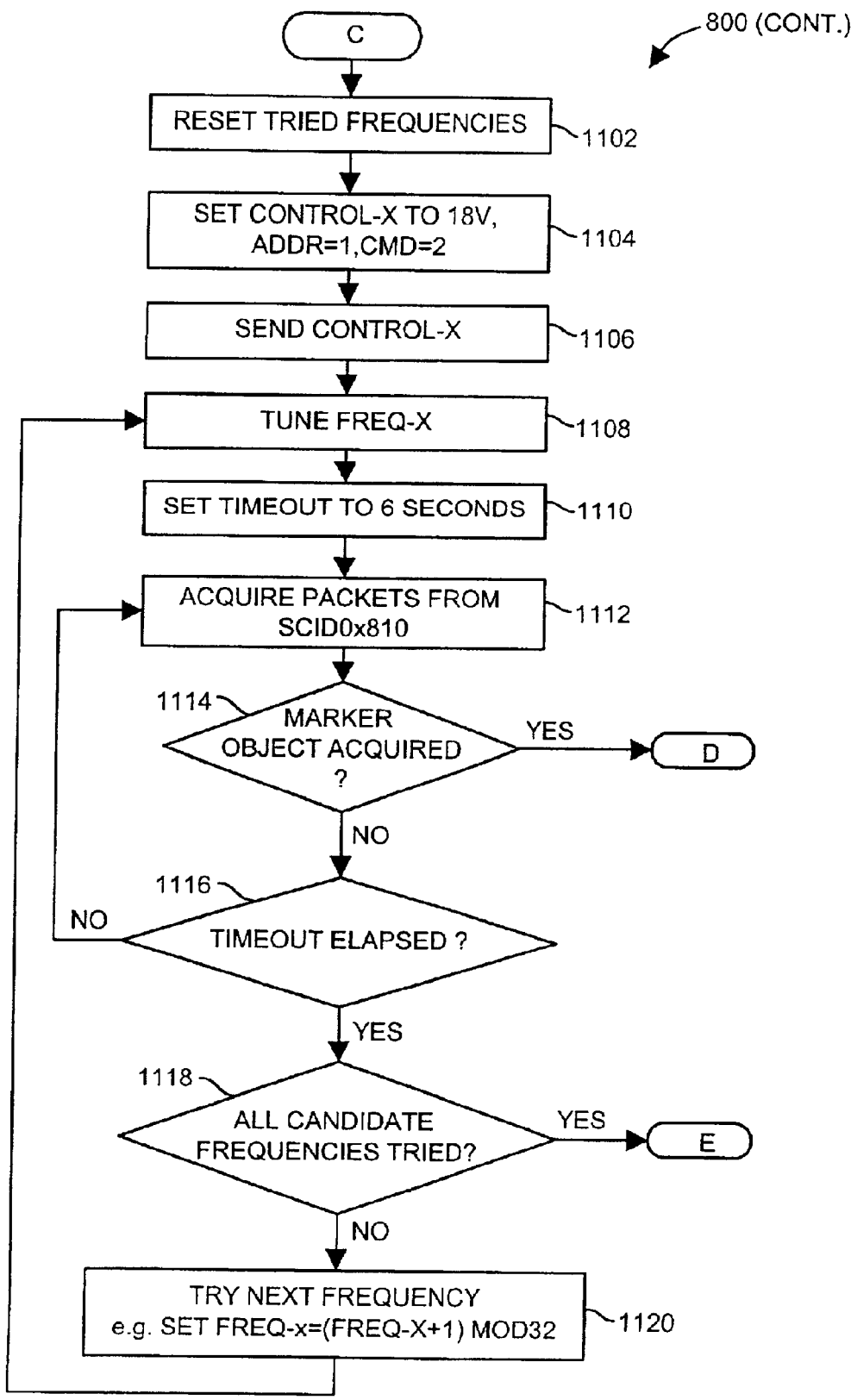
Figure 12:
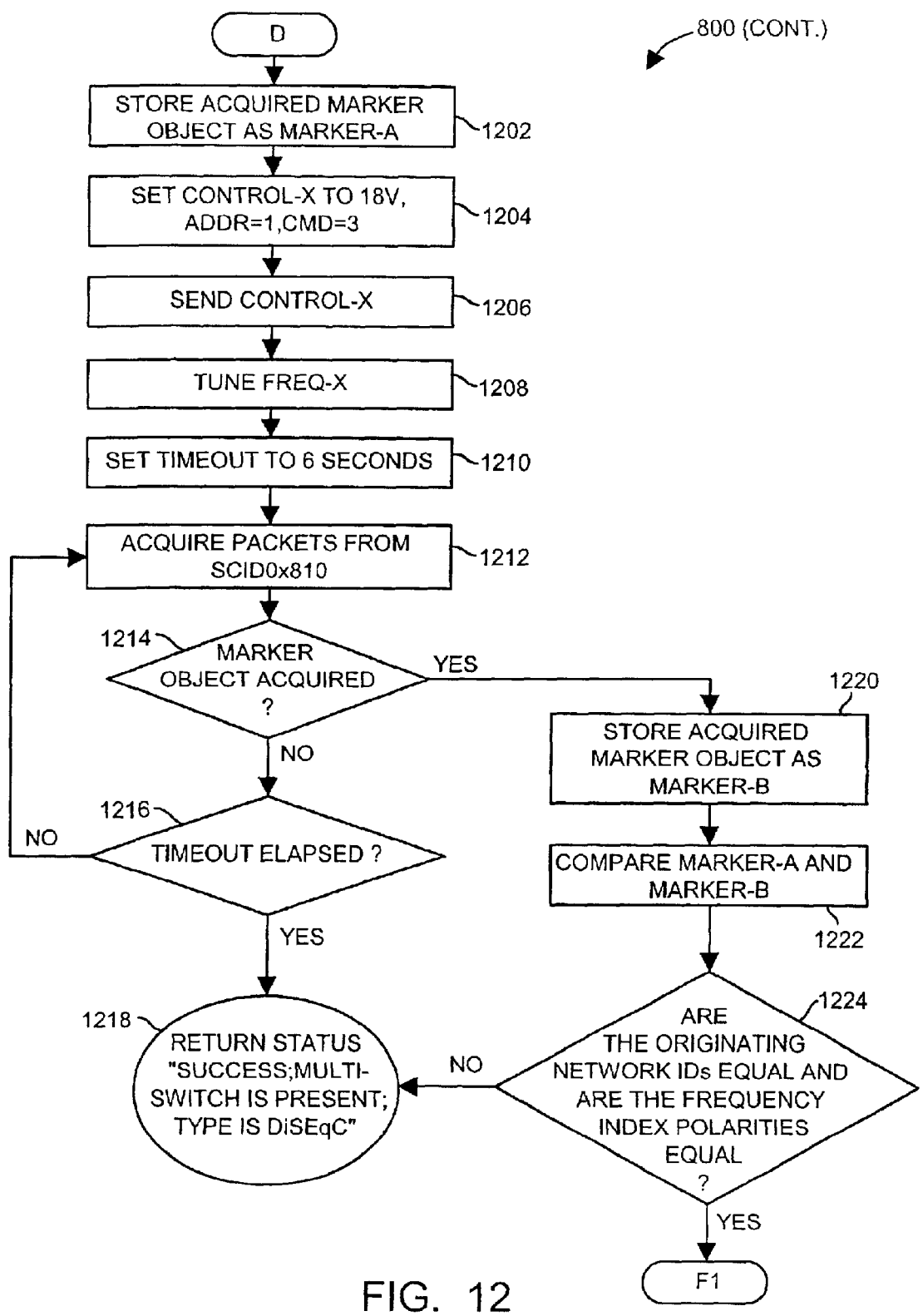
Figure 13:
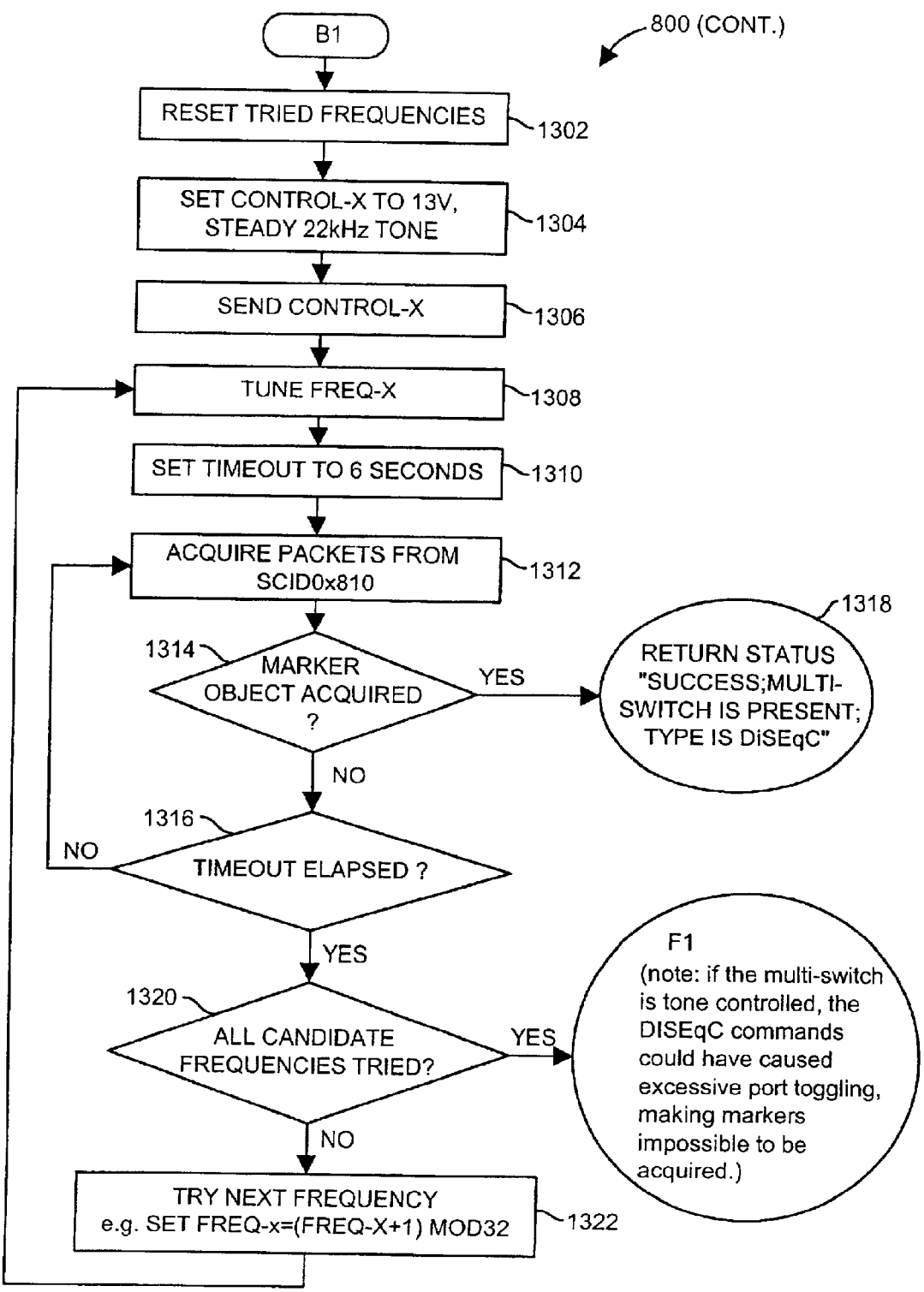
Figure 14:
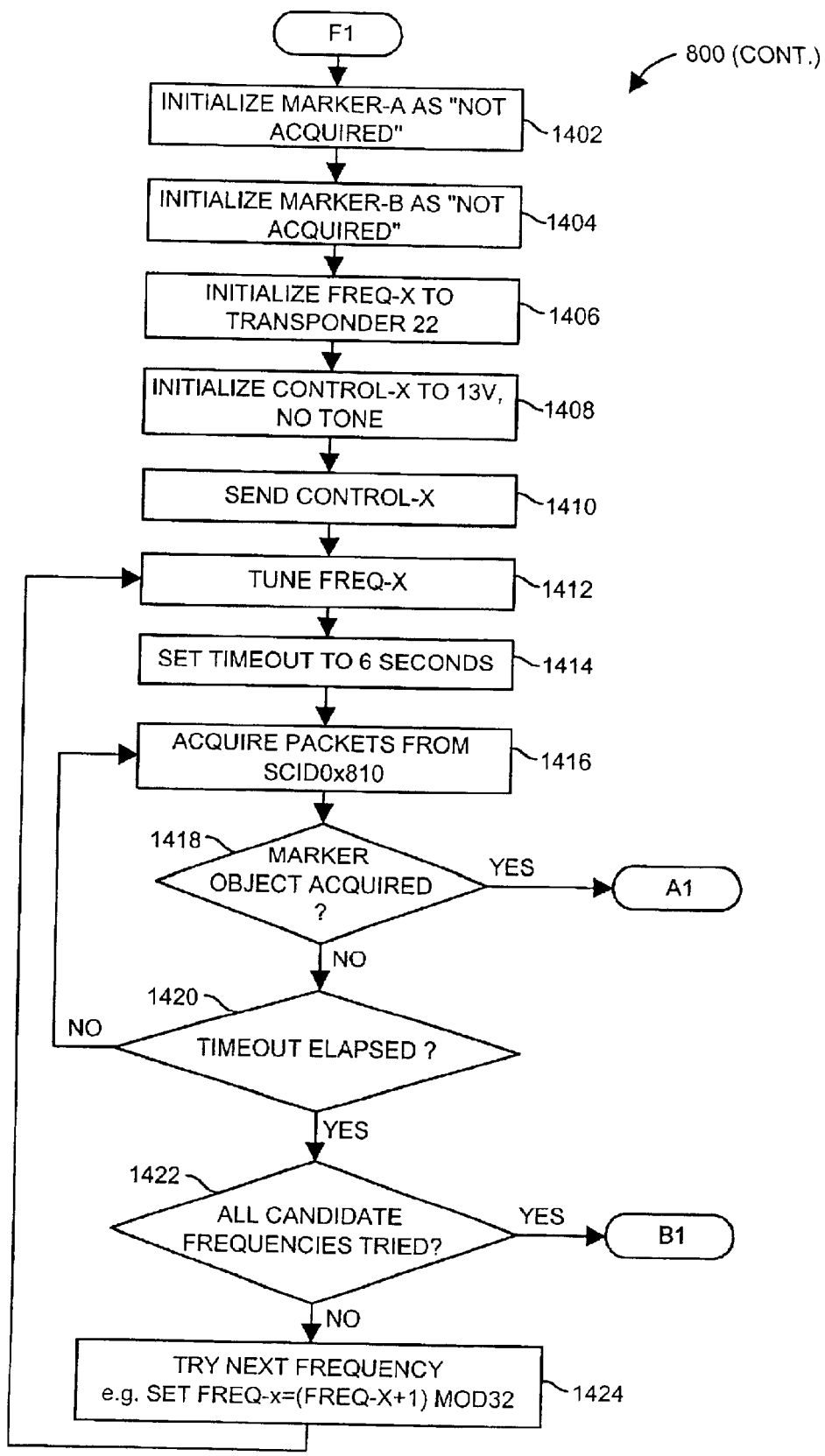
Figure 15:
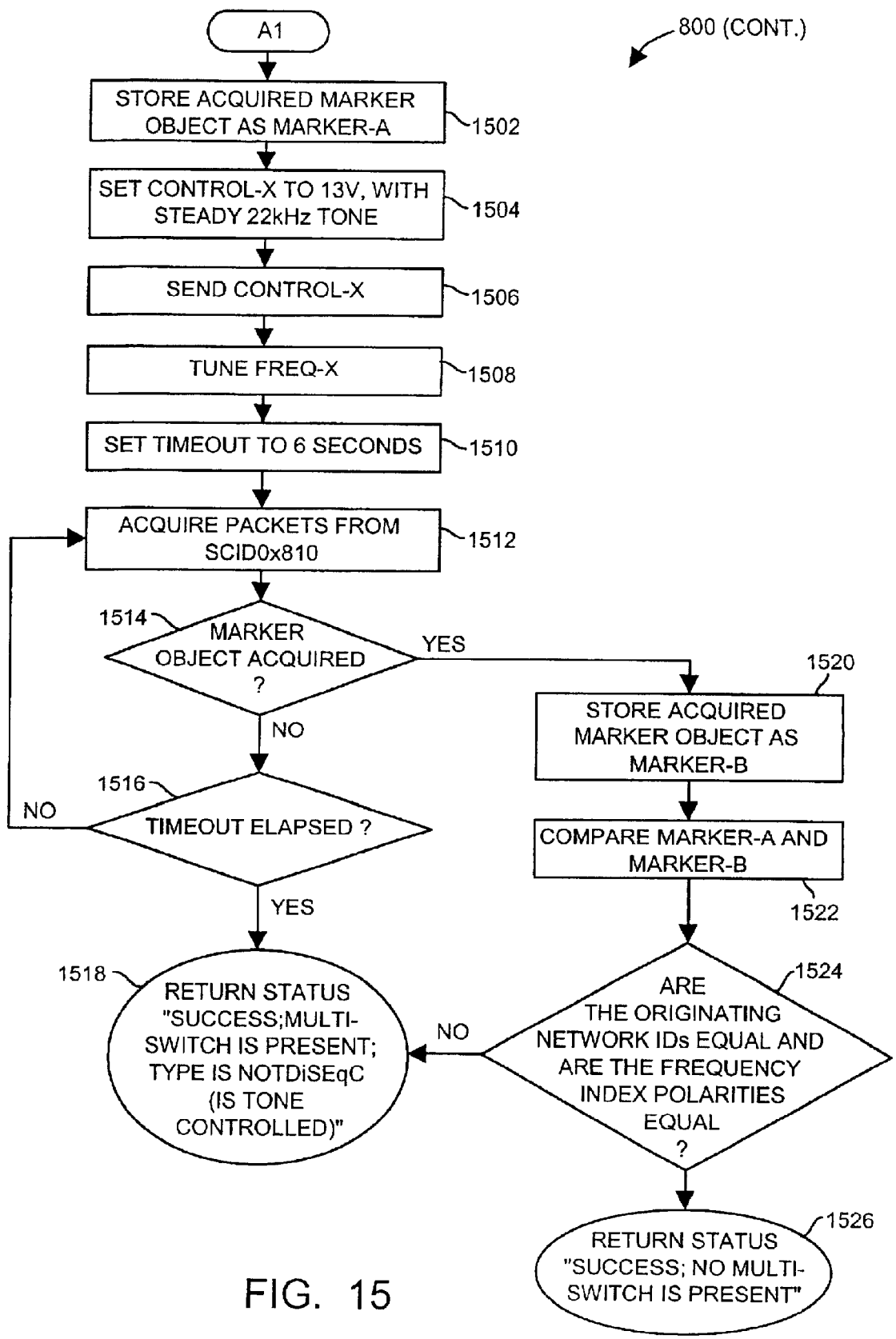
Figure 16:
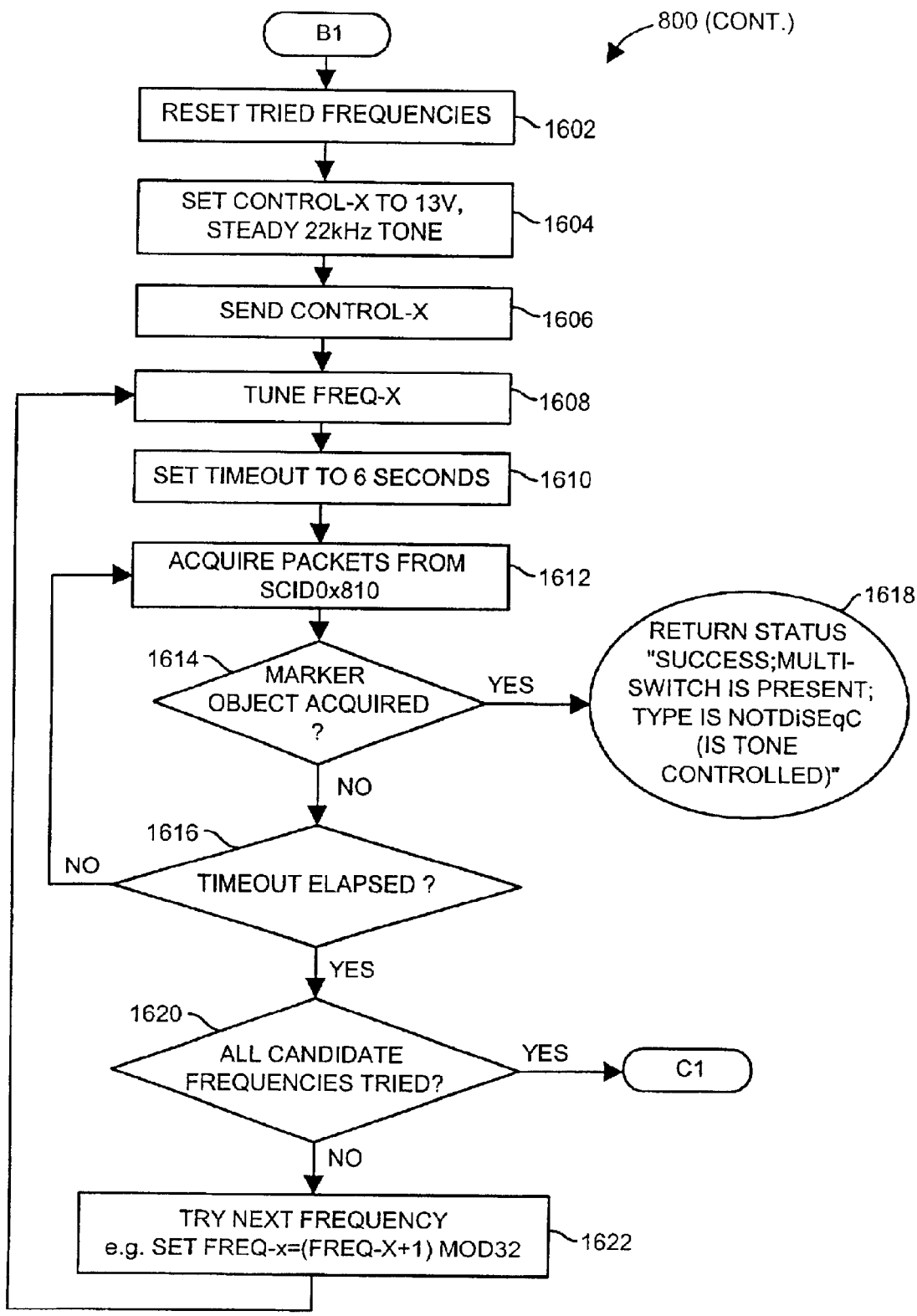
Figure 17:
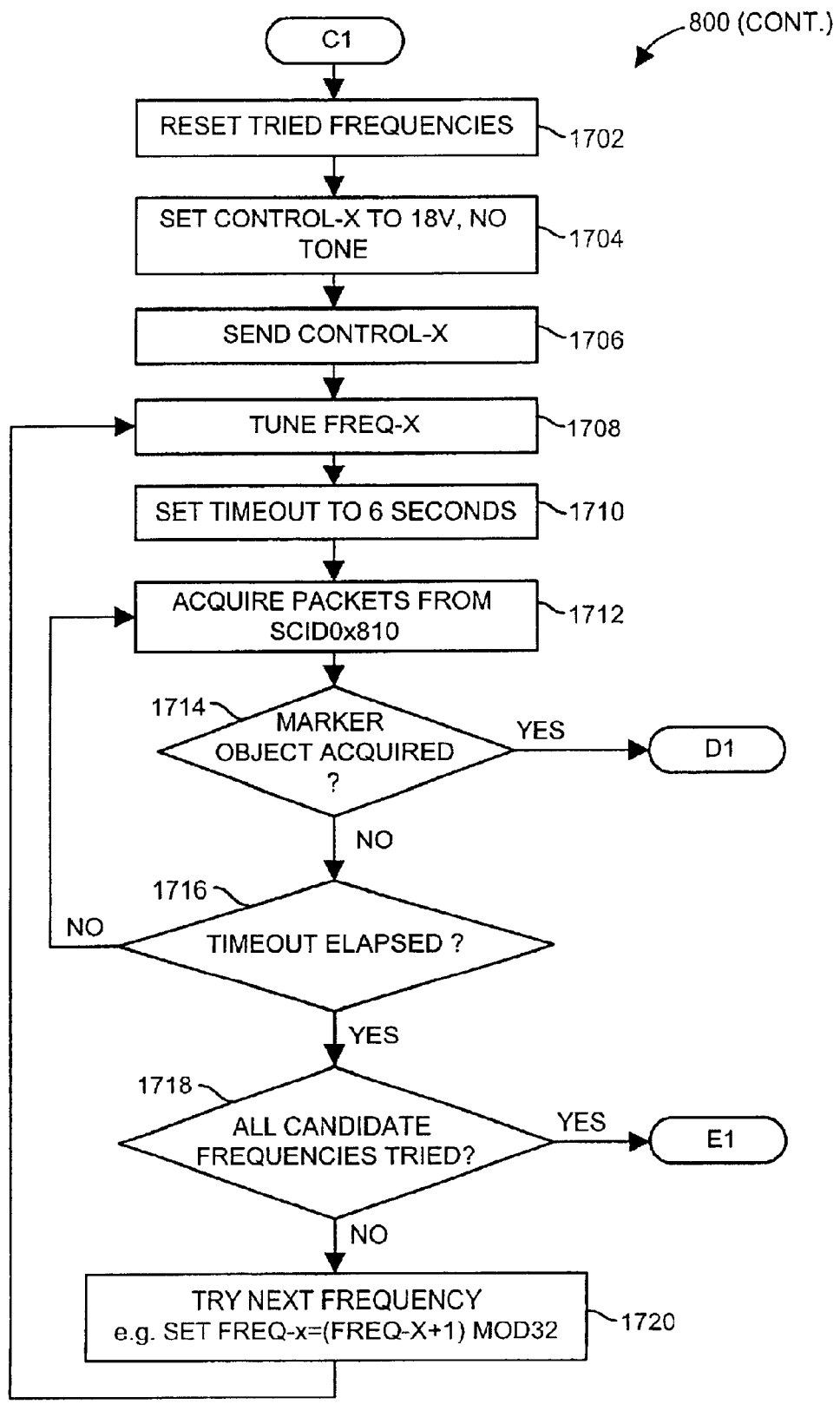
Figure 18:
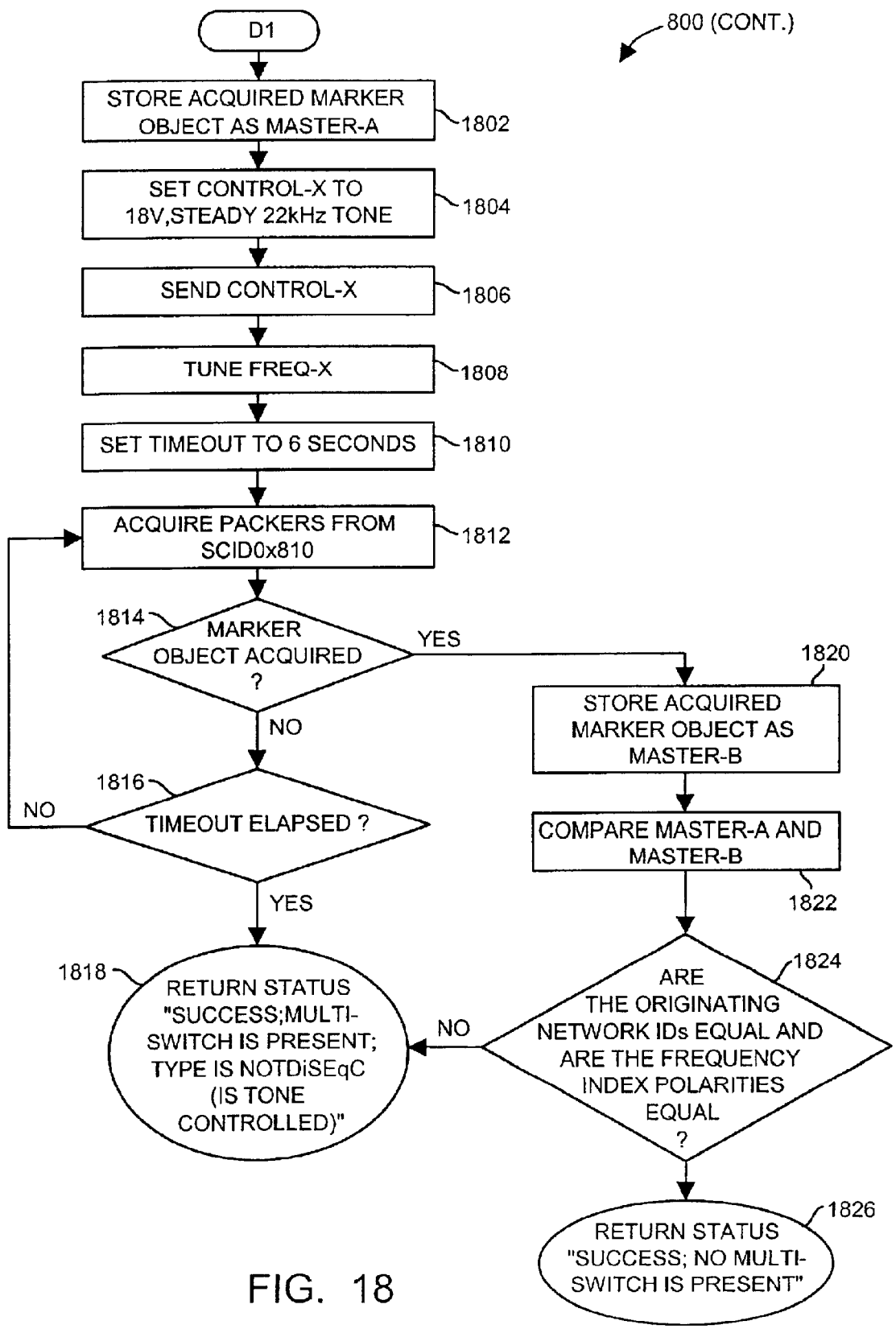
Figure 19:
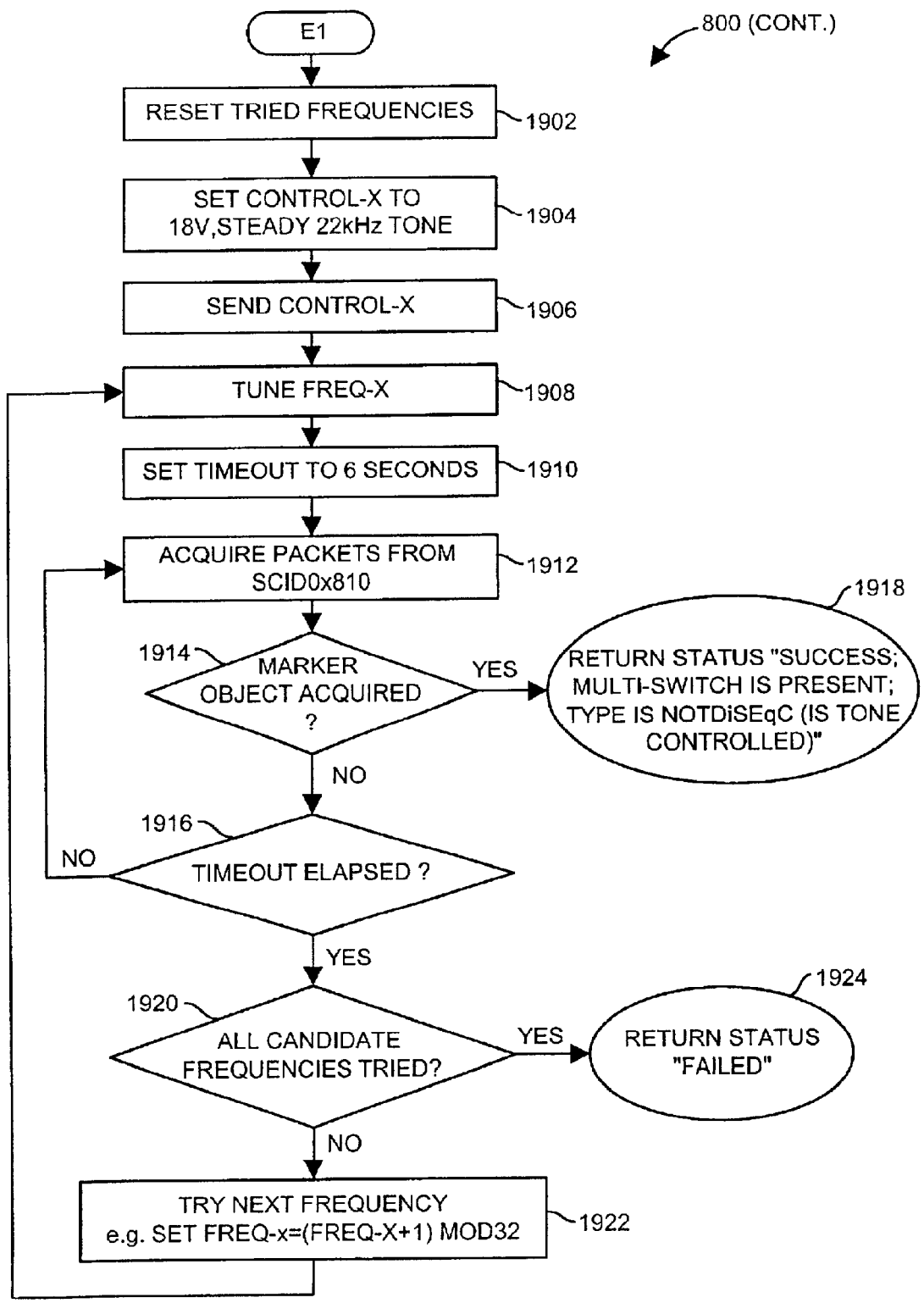

FIG. 6 is a more detailed block diagram of a portion of the receiver unit 36 shown in FIG. 1. In general, front-end circuitry inside the receiver unit 36 receives the L-band RF signals from the LNB 50, preferably via a multi-switch 200, and converts them back into the original digital data stream. Decoding circuitry, receives the original data stream and performs video/audio processing operations such as demultiplexing and decompression. A microprocessor or CPU 58 controls the overall operation of the receiver unit 36, including the selection of parameters, the set-up and control of components, channel selection, and many other functions.

Specifically, the receiver unit 36 includes a tuner 52, demodulator 54, FEC decoder 56, a micro-controller 58, a transport circuit 60, a channel demultiplexer 62, decryption circuit 64, an access card interface 66, an access card reader 68, a memory device 70, an audio/video decoder circuit 72 having a random-access-memory (RAM) 74, audio decoder 76, video decoder 78, an audio digital-to-analog circuit 80, an NTSC (or other) encoder 82, output drivers 84, a modem connection 86, a front panel user interface 88, and a power supply 90, coupled together as illustrated. A 27 MHZ clock signal generator 92 is also provided. The clock generator 92 generates a clock signal (CK) which is coupled to the audio/video decoder circuit 72 and which is frequency-calibrated by a signal received from the transport circuit 60, as shown.

The transport 60 receives the transport stream of digitized data packets containing video, audio, data, scheduling information, and other data. The digital packet information contains identifying headers as part of its overhead data. Under control of the micro-controller 58, the channel demultiplexer 62 filters out packets that are not currently of interest, and routes the data packets that are of interest through the decryption circuit 64 and, in the case of some packets, also through the access control circuits 66, 68 to their proper downstream destination. The decryption circuit 64 provides decryption for the data packets that have been encrypted. The access control circuits 66, 68 provide access control by any conventional means. For example, access control may be achieved by requiring a data packet to have a proper authorization code in order to be passed to the decryptor 64 and/or video decoder 78. The access card reader 68 can interface with an access card (not shown) that receives the packet authorization code, determines its validity, and generates a code that confirms to the transport 60 that the subject data packet is authorized.

The authorized data of interest, which now consists of the payload portions of the received data packets, are forwarded to decoder DRAM 74 for buffering and may optionally be intermediately stored in the memory device 70. The audio/video decoder 72 decodes the payloads stored in DRAM 74, as needed. The requested data is routed from the memory device 70 through the transport 60 to the audio/video decoder 72. At that time, the data is routed to the video decoder 78 (which includes display generating circuitry) and the NTSC (or other) encoder 64. The video decoder 78 reads in the compressed video data from the DRAM 74, parses it, creates quantized frequency domain coefficients, then performs an inverse quantization, inverse discrete cosine transform (DCT) and motion compensation. At this point, an image is reconstructed in the spatial domain. This image is then stored in a frame buffer in the DRAM 74. At a later time, the image is read out of the frame buffer in DRAM 74 and passed through the display circuitry to the encoder 82. The display circuitry (located in the video decoder 78) generate graphics that allow an electronic program guide to be displayed. The encoder 78 may convert the digital video signals to e.g., an analog signal according to the NTSC standard or to another desired output protocol (e.g., ATSC), thereby allowing video to be received by a conventional television 38 or other video output device.

A table showing a preferred set of control signals used to select a port on a multi-switch device is illustrated FIG. 7. Preferably, the auto-detection process runs only when initiated by the user. If the automatic detection process described below fails (e.g., due to rain fade or bad/missing cable connection), or the user chooses to bypass the automatic detection process, one of the default cases shown in FIG. 7 is preferably used. In addition, the process described below may be optimized to determine the current multi-switch type if one of the default cases shown in FIG. 7 is used. However, other installations are also supported, and the process described below may determine these other installations in order to permit proper network and polarity tuning after the auto-detection process is completed. The auto-detection process preferably attempts to acquire all networks defined by the currently transmitted "Boot Object" using the control signals defined in FIG. 7. For each network defined by the Boot Object, the IRD preferably associates the control signals necessary to tune that network.

A flowchart of a program that can be implemented by the receiver station 36 to determine the type of multi-switch connected to the receiver station 36 is illustrated in FIGS. 8–19. Preferably, the process 800 is embodied in a software program which is stored in the IRD memory 70 and executed by the IRD microprocessor 58 in a well known manner. However, some or all of the steps of the process 800 may be performed by another device. Further, one or more of the steps of the process 800 described below may be performed manually without the use of a microprocessor.

In general, the process 800 attempts to determine the type of multi-switch 200 connected to an IRD 36 by looking for a predetermined marker pattern on the first port of a multi-switch 200 using a DiSEqC control signal to address the first port of the multi-switch 200 (not knowing if this control signal will work, because the type of multi-switch is undetermined). If the marker is found on the first port, the IRD 36 changes the control signal to address the third port of the multi-switch 200. If the IRD 36 acquires a second marker form the third port of the multi-switch 200, and the second marker is the same as the first marker, then the multi-switch 200 is ignoring the commands (i.e., no switch was made as commanded) and more testing is needed. However, if a different marker (or no marker) is found on the third port, then the multi-switch 200 is responding to the DiSEqC commands. Therefore, the multi-switch 200 is determined to be a DiSEqC type of multi-switch 200.

If no marker is found on the first port using the DiSEqC control signal, the IRD 36 changes the control signal to address the third port of the multi-switch 200. If the IRD 36 acquires a marker from the third port of the multi-switch 200 (after having failed to acquire the marker from the first port), then the multi-switch 200 is responding to the DiSEqC commands. Therefore, the multi-switch 200 is determined to be a DiSEqC type of multi-switch 200. However, if no marker is received on the first or third ports of the multi-switch 200, the IRD 36 must repeat this process using DiSEqC commands on ports two and four. If no marker is received on the second or fourth ports of the multi-switch 200 using the DiSEqC control signal, the IRD 36 must start over using tone control signals instead of DiSEqC control signals.

If the marker is found on the first port using tone control signals, the IRD 36 changes the control signal to address the third port of the multi-switch 200. If the IRD 36 acquires a second marker from the third port of the multi-switch 200, and the second marker is the same as the first marker, then the commands are being ignored, therefore no multi-switch 200 is present. However, if a different marker (or no marker) is found on the third port, then the multi-switch 200 is responding to the tone control commands. Therefore, the multi-switch 200 is determined to be a tone controlled type of multi-switch 200, not a DiSEqC controlled type of multi-switch 200.

If no marker is found on the first port using the tone control signal, the IRD 36 changes the control signal to address the third port of the multi-switch 200. If the IRD 36 acquires a marker from the third port of the multi-switch 200 (after having failed to acquire the marker from the first port), then the multi-switch 200 is responding to the tone control commands. Therefore, the multi-switch 200 is determined to be a tone controlled type of multi-switch 200. However, if no marker is received on the first or third ports of the multi-switch 200, the IRD 36 must repeat this process using tone control signals on ports two and four. If no marker is received on the second or fourth ports of the multi-switch 200 using the tone control signal, then the multi-switch 200 is ignoring all commands and the type of multi-switch 200 remains undetermined and may be concluded as being absent.

The process 800 begins by initializing several key variables in order to look for a predetermined marker pattern on the first port of a multi-switch 200. Specifically, the process 800 initializes a first variable "marker-A" to "not acquired" (step 802). Similarly, the process 800 initializes a second variable "marker-B" to "not acquired" (step 804). In this manner, the process 800 starts afresh attempting to acquire both markers. In addition, the process 800 preferably initializes a variable "freq-x" to a starting frequency such as "transponder 22" (step 806). Similarly, the process 800 preferably initializes a variable "control-x" to a starting control signal such as "13V, address=1, command=2" (step 808). Of course, a person of ordinary skill in the art will readily appreciate that any variable names and storage schemes may be used for variables throughout this description. For example, "transponder 22" may be stored as "00010110." However, human readable names are used herein to increase the clarity of the description. After initializing the variables, the process 800 sends the control signal (i.e., the value of the variable "control-x") to the unknown multi-switch 200 (step 810) and tunes the IRD 36 to the value of "freq-x" (e.g., transponder 22 is frequency is 1280.18 MHz) (step 812). Freq-x is a variable representing the transponder, but a lookup table is used to retrieve the transponder's frequency value that is used for tuning.

The process 800 then looks for the predetermined marker object for a predetermined period of time. Accordingly, a time-out period is set (step 814). For example, a time-out period of six seconds may be used. Subsequently, the process 800 acquires packets using a predetermined service channel identification number (e.g., SCID 0x810) (step 816). The process 800 then looks for the marker in the acquired packets (step 818). If the marker is found, the process 800 continues at step 902 as described in detail below. However, if the marker is not found, the process 800 checks the timer (step 820). If there is time remaining, the process 800 continues to acquire packets (step 816) and look for the marker (step 818).

When the timer expires, the process 800 determines if all of the designated frequencies have been tried (step 822). This may be accomplished by checking for a maximum value (e.g., 32) associated with a frequency table index variable or in any other well known loop termination manner. If all of the designated frequencies have been tried, the process 800 continues at step 1002 as described in detail below. However, if all of the designated frequencies have not been tried, the process 800 moves on to the next frequency (step 824). For example, the variable "freq-x" may be incremented. Subsequently, the process 800 loops back to step 812 to tune the IRD 36 to the new value of "freq-x", and the process 800 continues.

In the event that a marker is acquired on the first port of the multi-switch 200 at step 818, the process 800 preferably stores the acquired marker object in the variable "marker-A" (step 902). See FIG. 9. Subsequently, the process 800 modifies the variable "control-x" to a new control signal such as "13V, address=1, command=3" (step 904). The process 800 then sends the new control signal to the multi-switch 200 (step 906) and tunes the IRD 36 to the value of "freq-x" (step 908).

In other words, the IRD 36 changes the control signal to address the third port of the multi-switch 200, but the IRD 36 stays on the current transponder as determined by step 824. If the IRD 36 acquires a second marker from the third port of the multi-switch 200, and the second marker is the same as the first marker, then the multi-switch 200 is ignoring the commands and more testing is needed as described in detail below. However, if a different marker (or no marker) is found on the third port, then the multi-switch 200 is responding to the commands. Therefore, the multi-switch 200 is determined to be a DiSEqC type of multi-switch 200.

Accordingly, a time-out period such as six seconds is set (step 910). Subsequently, the process 800 acquires packets using the predetermined service channel identification number (e.g., SCID 0x810) (step 912). The process 800 then looks for the marker in the acquired packets (step 914). If the marker is not found, the process 800 checks the timer (step 916). If there is time remaining, the process 800 continues to acquire packets (step 912) and look for the marker (step 914). If the timer expires before the marker is found, the process 800 returns a status of "success" with a determination that the multi-switch 200 is present and is a "DiSEqC type" (step 918).

However, if the marker is found at step 914, the process 800 preferably stores the acquired marker object in the variable "marker-B" (step 920). Once both markers are found, the process 800 compares marker-A and marker-B (step 922). If the originating network identifier of marker-A is equal to the originating network identifier of marker-B, and the frequency index polarity of marker-A is equal to the frequency index polarity of marker-B (step 924), the process 800 continues at step 1402 as described in detail below. However, if the originating network identifier of marker-A is not equal to the originating network identifier of marker-B, or the frequency index polarity of marker-A is not equal to the frequency index polarity of marker-B (step 924), the process 800 returns a status of "success" with a determination that the multi-switch 200 is present and is a "DiSEqC type" (step 918).

Referring back to FIG. 1, if the process 800 determines that all of the designated frequencies have been tried without finding the first marker (step 822), the process 800 resets the frequency pointer to the initial frequency (step 1002). See FIG. 10. For example, the process 800 may set the value of "freq-x" to "transponder 22." Subsequently, the process 800 modifies the variable "control-x" to a new control signal such as "13V, address=1, command=3" (step 1004). The process 800 then sends the new control signal to the multi-switch 200 (step 1006) and tunes the IRD 36 to the value of "freq-x" (step 1008).

In other words, the IRD 36 changes the control signal to address the third port of the multi-switch 200, and restarts at the beginning of the series of frequencies. If the IRD 36 acquires a first marker from the third port of the multi-switch 200 (after having failed to acquire the marker from the first port), then the multi-switch 200 is responding to the commands. Therefore, the multi-switch 200 is determined to be a DiSEqC type of multi-switch 200. However, if no marker is received on the first or third ports of the multi-switch 200, the IRD 36 must begin looking on ports two and four. In the preferred embodiment, ports two and four of the multi-switch 200 are addressed using 18V instead of 13V.

Accordingly, as before, the process 800 looks for the predetermined marker object for a predetermined period of time by setting a time-out period such as six seconds (step 1010). Subsequently, the process 800 acquires packets using the predetermined service channel identification number (step 1012). The process 800 then looks for the marker in the acquired packets (step 1014). If the marker is not found, the process 800 checks the timer (step 1016). If there is time remaining, the process 800 continues to acquire packets (step 1012) and look for the marker (step 1014). If the marker is found before the timer expires, the process 800 returns a status of "success" with a determination that the multi-switch 200 is present and is a "DiSEqC type" (step 1018).

However, if the timer expires before the marker is found, the process 800 determines if all of the designated frequencies have been tried (step 1020). If all of the designated frequencies have not been tried, the process 800 moves on to the next frequency as described in detail above (step 1022). Subsequently, the process 800 loops back to step 1008 to tune the IRD 36 to the new value of "freq-x", and the process 800 continues.

However, if all of the designated frequencies have been tried again without finding the first marker (step 1020), the process 800 resets the frequency pointer to the initial frequency (step 1102). See FIG. 11. In addition, the process 800 changes the variable "control-x" to a new control signal (e.g., 18V, address=1, command=2) (step 1104). The process 800 then sends the new control signal to the multi-switch 200 (step 1106) and tunes the IRD 36 to the value of "freq-x" (step 1108).

Yet again, the process 800 looks for the marker for a predetermined period of time by setting a time-out period such as six seconds (step 1110) and acquiring packets using the predetermined service channel identification number (step 1112). Again, the process 800 then looks for the marker in the acquired packets (step 1114). If the marker is not found, the process 800 checks the timer (step 1116). If there is time remaining, the process 800 continues to acquire packets (step 1112) and look for the marker (step 1114). If the marker is found before the timer expires, the process 800 goes to step 1202, which is described in detail below.

However, if the timer expires before the marker is found, the process 800 determines if all of the designated frequencies have been tried (step 1118). If all of the designated frequencies have been tried, the process 800 continues at step 1302 as described in detail below. However, if all of the designated frequencies have not been tried, the process 800 moves on to the next frequency (step 1120). Subsequently, the process 800 loops back to step 1108 to tune the IRD 36 to the new value of "freq-x", and the process 800 continues.

In the event that the marker is acquired from the second port of the multi-switch 200 at step 1114, the process 800 preferably stores the acquired marker object in the variable "marker-A" (step 1202). See FIG. 12. Subsequently, the process 800 modifies the variable "control-x" to a new control signal such as "18V, address=1, command=3" (step 1204). The process 800 then sends the new control signal to the multi-switch 200 (step 1206) and tunes the IRD 36 to the value of "freq-x" (step 1208).

In other words, the IRD 36 changes the control signal to address the fourth port of the multi-switch 200, but the IRD 36 stays on the current transponder as determined by step 1120. If the IRD 36 acquires a second marker from the fourth port of the multi-switch 200, and the second marker is the same as the first marker, then the multi-switch 200 is ignoring the commands and more testing is needed as described in detail below. However, if a different marker (or no marker) is found on the fourth port, then the multi-switch 200 is responding to the commands. Therefore, the multi-switch 200 is determined to be a DiSEqC type of multi-switch 200.

Again, the process 800 then looks for the marker for a predetermined time period. Accordingly, the time-out period is reset (step 1210). Subsequently, the process 800 acquires packets using the predetermined service channel identification number (step 1212). The process 800 then looks for the marker in the acquired packets (step 1214). If the marker is not found, the process 800 checks the timer (step 1216). If there is time remaining, the process 800 continues to acquire packets (step 1212) and look for the marker (step 1214). If the timer expires before the marker is found, the process 800 returns a status of "success" with a determination that the multi-switch 200 is present and is a "DiSEqC type" (step 1218).

However, if the marker is found at step 1214, the process 800 preferably stores the acquired marker object in the variable "marker-B" (step 1220). As described above, once both markers are found, the process 800 compares marker-A and marker-B (step 1222). If the originating network identifier of marker-A is equal to the originating network identifier of marker-B, and the frequency index polarity of marker-A is equal to the frequency index polarity of marker-B (step 1224), the process 800 continues at step 1402 as described in detail below. However, if the originating network identifier of marker-A is not equal to the originating network identifier of marker-B, or the frequency index polarity of marker-A is not equal to the frequency index polarity of marker-B (step 1224), the process 800 returns a status of "Success" with a determination that the multi-switch 200 is present and is a "DiSEqC type" (step 1218).

Referring back to FIG. 11, if all of the designated frequencies have been tried without finding the first marker (step 1118), the process 800 preferably resets the frequency pointer to the initial frequency (step 1302). See FIG. 13. In addition, the process 800 changes the variable "control-x" to a previous control signal (e.g., 18V, address=1, command=3) (step 1304). The process 800 then sends the control signal to the multi-switch 200 (step 1306) and tunes the IRD 36 to the value of "freq-x" (step 1308).

In other words, the IRD 36 changes the control signal to address the fourth port of the multi-switch 200, and restarts at the beginning of the series of frequencies. If the IRD 36 acquires a first marker from the fourth port of the multi-switch 200 (after having failed to acquire the marker from the second port), then the multi-switch 200 is responding to the commands. Therefore, the multi-switch 200 is determined to be a DiSEqC type of multi-switch switch 200. However, if no marker is received on the second or fourth ports of the multi-switch 200 using DiSEqC commands, the IRD 36 attempts to determine if a simplified multi-switch 200 (or no multi-switch) is present.

Accordingly, the process 800 once again looks for the marker for a predetermined period of time by setting a time-out period such as six seconds (step 1310) and acquiring packets using the predetermined service channel identification number (step 1312). As before, the process 800 then looks for the marker in the acquired packets (step 1314). If the marker is not found, the process 800 checks the timer (step 1316). If there is time remaining, the process 800 continues to acquire packets (step 1312) and look for the marker (step 1314). If the marker is found before the timer expires, the process 800 returns a status of "success" with a determination that the multi-switch 200 is present and is a "DiSEqC type" (step 1318). However, if the timer expires before the marker is found, the process 800 determines if all of the designated frequencies have been tried (step 1320). If all of the designated frequencies have not been tried, the process 800 moves on to the next frequency (step 1322) and loops back to step 1308 to tune the IRD 36 to the new value of "freq-x".

If the multi-switch 200 is tone controlled, DiSEqC commands may cause excessive port toggling. If excessive port toggling occurs, markers may be difficult or impossible to acquire. Accordingly, if all of the designated frequencies have been tried without finding the marker (step 1320), the process 800 continues at step 1402 as described in detail below. Similarly, referring back to FIG. 9 and FIG. 12, if the originating network identifier of marker-A is equal to the originating network identifier of marker-B, and the frequency index polarity of marker-A is equal to the frequency index polarity of marker-B (step 924 or step 1224), the process 800 continues at step 1402 as described in detail below.

At step 1402, the process 800 reinitializes the key variables in order to look for the predetermined marker pattern on the first port of a multi-switch 200 again. However, this time the IRD 36 will attempt to address the multi-switch 200 using different control signals. Specifically, the process 800 initializes a first variable "marker-A" to "not acquired" (step 1402). Similarly, the process 800 initializes a second variable "marker-B" to "not acquired" (step 1404). In this manner, the process 800 starts afresh attempting to acquire both markers. In addition, the process 800 preferably initializes a variable "freq-x" to a starting frequency such as "transponder 22" (step 1406). Similarly, the process 800 preferably initializes a variable "control-x" to a starting control signal such as "13V, with no tone" (step 1408). After initializing the variables, the process 800 sends the control signal (i.e., the value of the variable "control-x") to the unknown multi-switch 200 (step 1410) and tunes the IRD 36 to the value of "freq-x" (e.g., go to transponder 22) (step 1412).

The process 800 then looks for the predetermined marker object for a predetermined period of time. Accordingly, a time-out period is set (step 1414). For example, a time-out period of six seconds may be used. Subsequently, the process 800 acquires packets using a predetermined service channel identification number (e.g., SCID 0x810) (step 1416). The process 800 then looks for the marker in the acquired packets (step 1418). If the marker is found, the process 800 continues at step 1502 as described in detail below. However, if the marker is not found, the process 800 checks the timer (step 1420). If there is time remaining, the process 800 continues to acquire packets (step 1416) and look for the marker (step 1418).

When the timer expires, the process 800 determines if all of the designated frequencies have been tried (step 1422). As described above, determining if all of the designated frequencies have been tried may be accomplished by checking for a maximum value (e.g., 32) associated with a frequency table index variable or in any other well known loop termination manner. If all of the designated frequencies have been tried, the process 800 continues at step 1602 as described in detail below. However, if all of the designated frequencies have not been tried, the process 800 moves on to the next frequency (step 1424). For example, the variable "freq-x" may be incremented. Subsequently, the process 800 loops back to step 1412 to tune the IRD 36 to the new value of "freq-x", and the process 800 continues.

In the event that a marker is acquired on the first port of the multi-switch 200 at step 1418, the process 800 preferably stores the acquired marker object in the variable "marker-A" (step 1502). See FIG. 15. Subsequently, the process 800 modifies the variable "control-x" to a new control signal such as "13V, with a steady 22 kHz tone" (step 1504). The process 800 then sends the new control signal to the multi-switch 200 (step 1506) and tunes the IRD 36 to the value of "freq-x" (step 1508).

In other words, the IRD 36 changes the control signal to address the third port of the multi-switch 200, but the IRD 36 stays on the current transponder as determined by step 1424. If the IRD 36 acquires a second marker from the third port of the multi-switch 200, and the second marker is the same as the first marker, then the commands are being ignored, indicating that no multi-switch 200 is present. However, if a different marker (or no marker) is found on the third port, then the multi-switch 200 is responding to the commands. Therefore, the multi-switch 200 is determined to be a DiSEqC type of multi-switch 200.

Accordingly, a time-out period such as six seconds is set (step 1510). Subsequently, the process 800 acquires packets using the predetermined service channel identification number (e.g., SCID 0x810) (step 1512). The process 800 then looks for the marker in the acquired packets (step 1514). If the marker is not found, the process 800 checks the timer (step 1516). If there is time remaining, the process 800 continues to acquire packets (step 1512) and look for the marker (step 1514). If the timer expires before the marker is found, the process 800 returns a status of "success" with a determination that the multi-switch 200 is present and is a "DiSEqC type" (step 1518).

However, if the marker is found at step 1514, the process 800 preferably stores the acquired marker object in the variable "marker-B" (step 1520). Once both markers are found, the process 800 compares marker-A and marker-B (step 1522). If the originating network identifier of marker-A is equal to the originating network identifier of marker-B, and the frequency index polarity of marker-A is equal to the frequency index polarity of marker-B (step 1524), the process 800 returns a status of "success" with a determination that "no multi-switch is present" (step 1526). However, if the originating network identifier of marker-A is not equal to the originating network identifier of marker-B, or the frequency index polarity of marker-A is not equal to the frequency index polarity of marker-B (step 1524), the process 800 returns a status of "success" with a determination that the multi-switch 200 is present and is a "DiSEqC type" (step 1518).

Referring back to FIG. 14, if the process 800 determines that all of the designated frequencies have been tried without finding the first marker (step 1422), the process 800 resets the frequency pointer to the initial frequency (step 1602). See FIG. 16. For example, the process 800 may set the value of "freq-x" to "transponder 22." Subsequently, the process 800 modifies the variable "control-x" to a new control signal such as "13V, with a steady 22 kHz tone" (step 1604). The process 800 then sends the new control signal to the multi-switch 200 (step 1606) and tunes the IRD 36 to the value of "freq-x" (step 1608).

In other words, the IRD 36 changes the control signal to address the third port of the multi-switch 200, and restarts at the beginning of the series of frequencies. If the IRD 36 acquires a first marker from the third port of the multi-switch 200 (after having failed to acquire the marker from the first port), then the multi-switch 200 is responding to the commands. Therefore, the multi-switch 200 is determined to be a tone controlled type of multi-switch 200, not a DiSEqC type. However, if no marker is received on the first or third ports of the multi-switch 200, the IRD 36 must begin looking on ports two and four (e.g., the 18V ports).

Accordingly, as before, the process 800 looks for the predetermined marker object for a predetermined period of time by setting a time-out period such as six seconds (step 1610). Subsequently, the process 800 acquires packets using the predetermined service channel identification number (step 1612). The process 800 then looks for the marker in the acquired packets (step 1614). If the marker is not found, the process 800 checks the timer (step 1616). If there is time remaining, the process 800 continues to acquire packets (step 1612) and look for the marker (step 1614). If the marker is found before the timer expires, the process 800 returns a status of "success" with a determination that the multi-switch 200 is present and is a "tone controlled type" (step 1618).

However, if the timer expires before the marker is found, the process 800 determines if all of the designated frequencies have been tried (step 1620). If all of the designated frequencies have not been tried, the process 800 moves on to the next frequency (step 1622). Subsequently, the process 800 loops back to step 1608 to tune the IRD 36 to the new value of "freq-x", and the process 800 continues.

However, if all of the designated frequencies have been tried again without finding the first marker (step 1620), the process 800 resets the frequency pointer to the initial frequency (step 1702). See FIG. 17. In addition, the process 800 changes the variable "control x" to a new control signal (e.g., 18V, with no tone) (step 1704). The process 800 then sends the new control signal to the multi-switch 200 (step 1706) and tunes the IRD 36 to the value of "freq-x" (step 1708).

Yet again, the process 800 looks for the marker for a predetermined period of time by setting a time-out period such as six seconds (step 1710) and acquiring packets using the predetermined service channel identification number (step 1712). Again, the process 800 then looks for the marker in the acquired packets (step 1714). If the marker is not found, the process 800 checks the timer (step 1716). If there is time remaining, the process 800 continues to acquire packets (step 1712) and look for the marker (step 1714). If the marker is found before the timer expires, the process 800 goes to step 1802, which is described in detail below.

However, if the timer expires before the marker is found, the process 800 determines if all of the designated frequencies have been tried (step 1718). If all of the designated frequencies have been tried, the process 800 continues at step 1902 as described in detail below. However, if all of the designated frequencies have not been tried, the process 800 moves on to the next frequency (step 1720). Subsequently, the process 800 loops back to step 1708 to tune the IRD 36 to the new value of "freq-x", and the process 800 continues.

In the event that the marker is acquired from the second port of the multi-switch 200 at step 1714, the process 800 preferably stores the acquired marker object in the variable "marker-A" (step 1802). See FIG. 18. Subsequently, the process 800 modifies the variable "control-x" to a new control signal such as "18V, with a steady 22 kHz tone" (step 1804). The process 800 then sends the new control signal to the multi-switch 200 (step 1806) and tunes the IRD 36 to the value of "freq-x" (step 1808).

In other words, the IRD 36 changes the control signal to address the fourth port of the multi-switch 200, but the IRD 36 stays on the current transponder as determined by step 1720. If the IRD 36 acquires a second marker from the fourth port of the multi-switch 200, and the second marker is the same as the first marker, then the commands are being ignored and no multi-switch is present. However, if a different marker (or no marker) is found on the fourth port, then the multi-switch 200 is responding to the commands. Therefore, the multi-switch 200 is determined to be a tone controlled type of multi-switch 200.

Again, the process 800 looks for the marker for a predetermined time period. Accordingly, the time-out period is reset (step 1810). Subsequently, the process 800 acquires packets using the predetermined service channel identification number (step 1812). The process 800 then looks for the marker in the acquired packets (step 1814). If the marker is not found, the process 800 checks the timer (step 1816). If there is time remaining, the process 800 continues to acquire packets (step 1812) and look for the marker (step 1814). If the timer expires before the marker is found, the process 800 returns a status of "success" with a determination that the multi-switch 200 is present and is a "tone controlled type" (step 1818).

However, if the marker is found at step 1814, the process 800 preferably stores the acquired marker object in the variable "marker-B" (step 1820). As described above, once both markers are found, the process 800 compares marker-A and marker-B (step 1822). If the originating network identifier of marker-A is equal to the originating network identifier of marker-B, and the frequency index polarity of marker-A is equal to the frequency index polarity of marker-B (step 1824), the process 800 returns a status of "success" with a determination that "no multi-switch is present" (step 1826). However, if the originating network identifier of marker-A is not equal to the originating network identifier of marker-B, or the frequency index polarity of marker-A is not equal to the frequency index polarity of marker-B (step 1824), the process 800 returns a status of "success" with a determination that the multi-switch 200 is present and is a "tone controlled type" (step 1818).

Referring back to FIG. 17, if all of the designated frequencies have been tried without finding the first marker (step 1718), the process 800 preferably resets the frequency pointer to the initial frequency (step 1902). See FIG. 19. In addition, the process 800 changes the variable "control-x" to a previous control signal (e.g., 18V, with a steady 22 kHz tone) (step 1904). The process 800 then sends the control signal to the multi-switch 200 (step 1906) and tunes the IRD 36 to the value of "freq-x" (step 1908).

In other words, the IRD 36 changes the control signal to address the fourth port of the multi-switch 200, and restarts at the beginning of the series of frequencies. If the IRD 36 acquires a first marker from the fourth port of the multi-switch 200 (after having failed to acquire the marker from the second port), then the multi-switch 200 is responding to the commands. Therefore, the multi-switch 200 is determined to be a tone controlled type of multi-switch 200. However, if no marker is received on the second or fourth ports of the multi-switch 200, the process 800 has failed to determine the type of multi-switch 200 present (if any).

Accordingly, the process 800 once again looks for the marker for a predetermined period of time by setting a time-out period such as six seconds (step 1910) and acquiring packets using the predetermined service channel identification number (step 1912). As before, the process 800 then looks for the marker in the acquired packets (step 1914). If the marker is not found, the process 800 checks the timer (step 1916). If there is time remaining, the process 800 continues to acquire packets (step 1912) and look for the marker (step 1914). If the marker is found before the timer expires, the process 800 returns a status of "success" with a determination that the multi-switch 200 is present and is a "tone controlled type" (step 1918). However, if the timer expires before the marker is found, the process 800 determines if all of the designated frequencies have been tried (step 1920). If all of the designated frequencies have not been tried, the process 800 moves on to the next frequency (step 1922) and loops back to step 1908 to tune the IRD 36 to the new value of "freq-x". If all of the designated frequencies have been tried without finding the marker (step 1920), the process 800 returns a status of "failed" (step 1924).

In summary, persons of ordinary skill in the art will readily appreciate that a method and apparatus for determining a direct-to-home satellite receiver multi-switch type has been provided. Systems implementing the teachings of the present invention may automatically determine the type of multi-switch connected, thereby relieving the user of additional burdensome setup procedures.

The foregoing description has been presented for the purposes of illustration and description. It is not intended to be exhaustive or to limit the invention to the precise form disclosed. Many modifications and variations are possible in light of the above teachings. It is intended that the scope of the invention be limited not by this detailed description, but rather by the claims appended hereto.

What is claimed is:

1. A method for automatically determining a multi-switch type for a multi-switch attached to a receiver, the method comprising the steps of:

generating a first control signal at a multi-switch connection port, the first control signal being designed to address a first port of a first type of multi-switch;

determining if a first predetermined marker pattern is received within a first predetermined time limit after generating the first control signal, the first predetermined marker pattern having a first identification code;

generating a second control signal at the multi-switch connection port, the second control signal being designed to address a second port of the first type of multi-switch;

determining if a second predetermined marker pattern is received within a second predetermined time limit after generating the second control signal, the second predetermined marker pattern having a second identification code;

determining if the first identification code is equal to the second identification code; and determining that the multi-switch type is the first type of multi-switch if the first identification code is not equal to the second identification code.

2. A method as defined in claim 1, wherein the step of generating a first control signal at a multi-switch connection port, comprises the step of generating a DiSEqC control signal at the multi-switch connection port.

3. A method as defined in claim 1, wherein the step of generating a first control signal at a multi-switch connection port, comprises the step of generating a tone control signal at the multi-switch connection port.

4. A method as defined in claim 1, wherein the step of generating a first control signal at a multi-switch connection port, comprises the step of generating 13 volts at the multi-switch connection port.

5. A method as defined in claim 1, wherein the step of generating a first control signal at a multi-switch connection port, comprises the step of generating 18 volts at the multi-switch connection port.

6. A method as defined in claim 1, wherein the step of determining if a first predetermined marker pattern is received, comprises the step of determining if the first predetermined marker pattern is received on a service channel, the service channel having an identification number of 0x810.

7. A method as defined in claim 1, further comprising the step of determining that the multi-switch type is the first type of multi-switch if the step of determining if a first predetermined marker pattern is received determines that the first predetermined marker pattern is received and the step of determining if a second predetermined marker pattern is received determines that the second predetermined marker pattern is not received.

8. A method as defined in claim 1, further comprising the steps of:

generating a third control signal at the multi-switch connection port, the third control signal being designed to address a first port of a second type of multi-switch;

determining if a third predetermined marker pattern is received within a third predetermined time limit after generating the third control signal, the third predetermined marker pattern having a third identification code;

generating a fourth control signal at the multi-switch connection port, the fourth control signal being designed to address a second port of the second type of multi-switch;

determining if a fourth predetermined marker pattern is received within a fourth predetermined time limit after generating the fourth control signal, the fourth predetermined marker pattern having a fourth identification code;

determining if the third identification code is equal to the fourth identification code; and determining that the multi-switch type is the second type of multi-switch if the third identification code is not equal to the fourth identification code.

9. A method as defined in claim 8, wherein the step of generating a first control signal at the multi-switch connection port, comprises the step of generating a DiSEqC control signal at the multi-switch connection port and the step of generating a third control signal at the multi-switch connection port, comprises the step of generating a tone control signal at the multi-switch connection port.

10. A method as defined in claim 8, wherein the step of generating a third control signal at
the multi-switch connection port, comprises the step of generating 13 volts at the multi-switch connection port.

11. A method as defined in claim 8, wherein the step of generating a third control signal at the multi-switch connection port, comprises the step of generating 18 volts at the multi-switch connection port.

12. A method as defined in claim 8, wherein the step of determining if a third predetermined marker pattern is received, comprises the step of determining if the third predetermined marker pattern is received on a service channel, the service channel having an identification number of 0x810.

13. A method as defined in claim 8, further comprising the step of determining that the multi-switch type is the second type of multi-switch if the step of determining if a third predetermined marker pattern is received determines that the third predetermined marker pattern is received and the step of determining if a fourth predetermined marker pattern is received determines that the fourth predetermined marker pattern is not received.

14. A method as defined in claim 8, wherein the first predetermined time limit, the second predetermined time limit, the third predetermined time limit, and the fourth predetermined time limit are equal.

15. An integrated receiver/decoder for use in a direct-to-home satellite system, the integrated receiver/decoder comprising:

a receiver for receiving direct-to-home satellite television signals;

a multi-switch connection port coupled to the receiver for selecting direct-to-home satellite television signals; and a controller operatively coupled to the receiver and the multi-switch connection port, the controller comprising a microprocessor and a memory device, the memory device storing a software program;

the software program being designed to generate a first control signal at the multi-switch connection port, the first control signal being designed to address a first port of a first type of multi-switch;

the software program being designed to determine if a first predetermined marker pattern is received within a first predetermined time limit after generating the first control signal, the first predetermined marker pattern having a first identification code;

the software program being designed to generate a second control signal at the multi-switch connection port, the second control signal being designed to address a second port of the first type of multi-switch;

the software program being designed to determine if a second predetermined marker pattern is received within a second predetermined time limit after generating the second control signal, the second predetermined marker pattern having a second identification code;

the software program being designed to determine if the first identification code is equal to the second identification code; and the software program being designed to determine that the multi-switch type is the first type of multi-switch if the first identification code is not equal to the second identification code.

16. An integrated receiver/decoder as defined in claim 15, wherein the software program is designed to generate a DiSEqC control signal at the multi-switch connection port.

17. An integrated receiver/decoder as defined in claim 15, wherein the software program is designed to generate a tone control signal at the multi-switch connection port.

18. An integrated receiver/decoder as defined in claim 15, wherein the software program is designed to determine that the multi-switch type is the first type of multi-switch if the first predetermined marker pattern is received and the second predetermined marker pattern is not received.

19. An integrated receiver/decoder as defined in claim 15, wherein:
   the software program is designed to generate a third control signal at the multi-switch connection port, the third control signal being designed to address a first port of a second type of multi-switch;
   the software program being designed to determine if a third predetermined marker pattern is received within a third predetermined time limit after generating the third control signal, the third predetermined marker pattern having a third identification code;
   the software program being designed to generate a fourth control signal at the multi-switch connection port, the fourth control signal being designed to address a second port of the second type of multi-switch;
   the software program being designed to determine if a fourth predetermined marker pattern is received within a fourth predetermined time limit after generating the fourth control signal, the fourth predetermined marker pattern having a fourth identification code;
   the software program being designed to determine if the third identification code is equal to the fourth identification code; and
   the software program being designed to determine that the multi-switch type is the second type of multi-switch if the third identification code is not equal to the fourth identification code.

20. An integrated receiver/decoder as defined in claim 19, wherein the software program is designed to generate a DiSEqC control signal at the multi-switch connection port and a tone control signal at the multi-switch connection port.

21. An integrated receiver/decoder as defined in claim 19, wherein the software program is designed to determine that the multi-switch type is the second type of multi-switch if the third predetermined marker pattern is received and the fourth predetermined marker pattern is not received.

* * * * *